May 12, 1964
J. L. REIMERS ETAL
3,132,675
DRUPE PITTER
Original Filed June 10, 1957
14 Sheets-Sheet 1
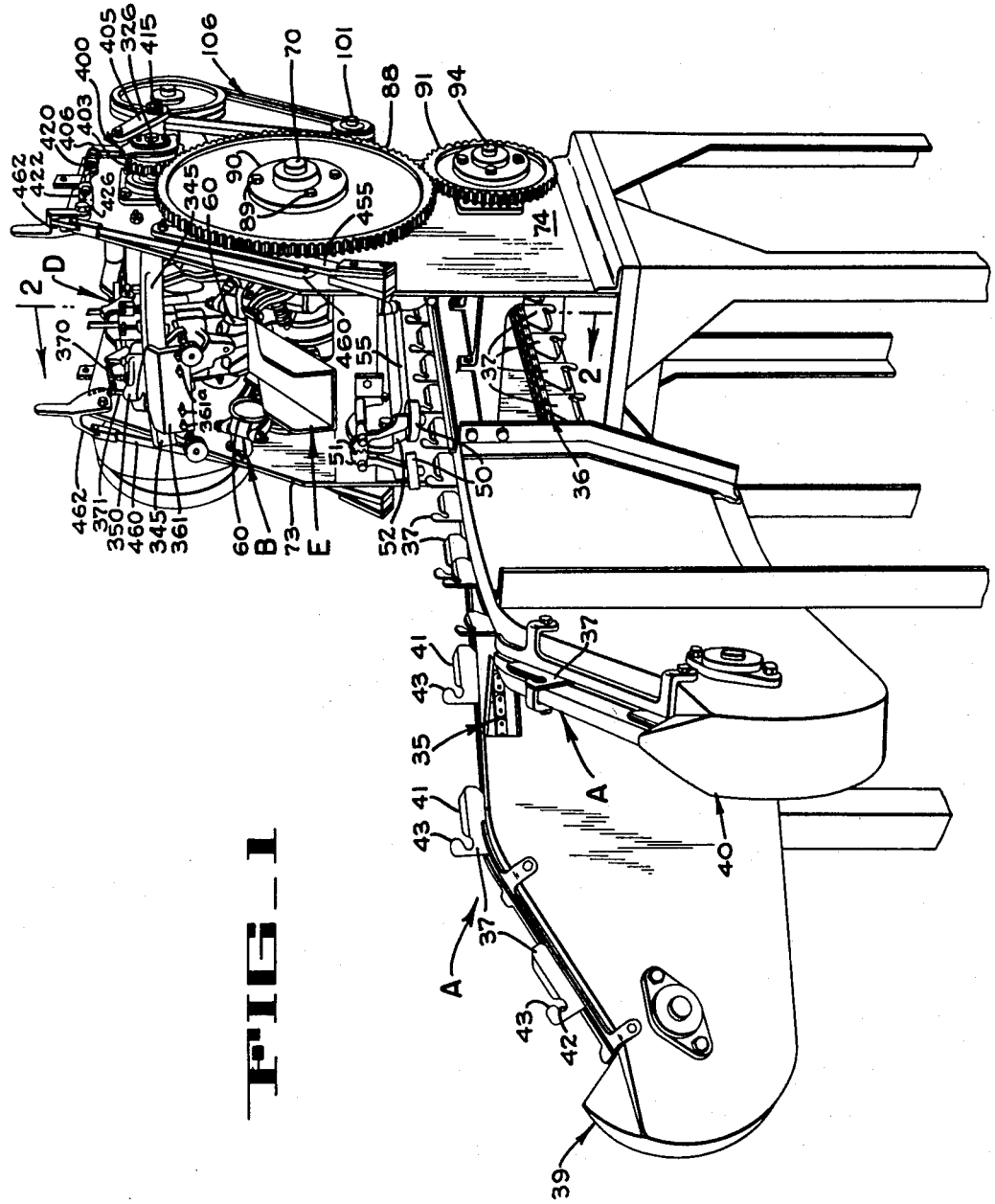
FIG_1
INVENTORS
JAMES L. REIMERS
PAUL C. WILBUR
BY *Hans G. Hoffmeister*
ATTORNEY

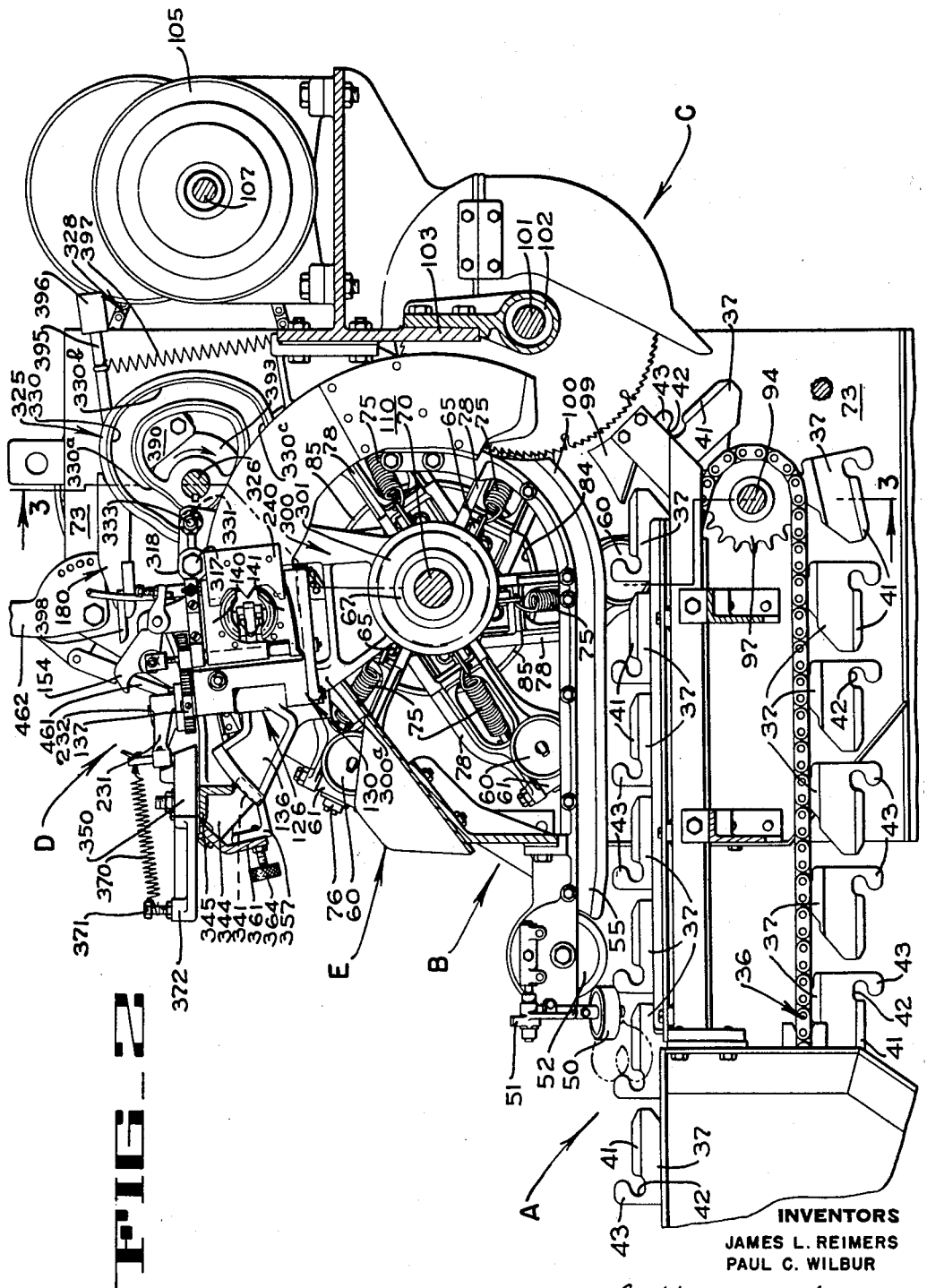

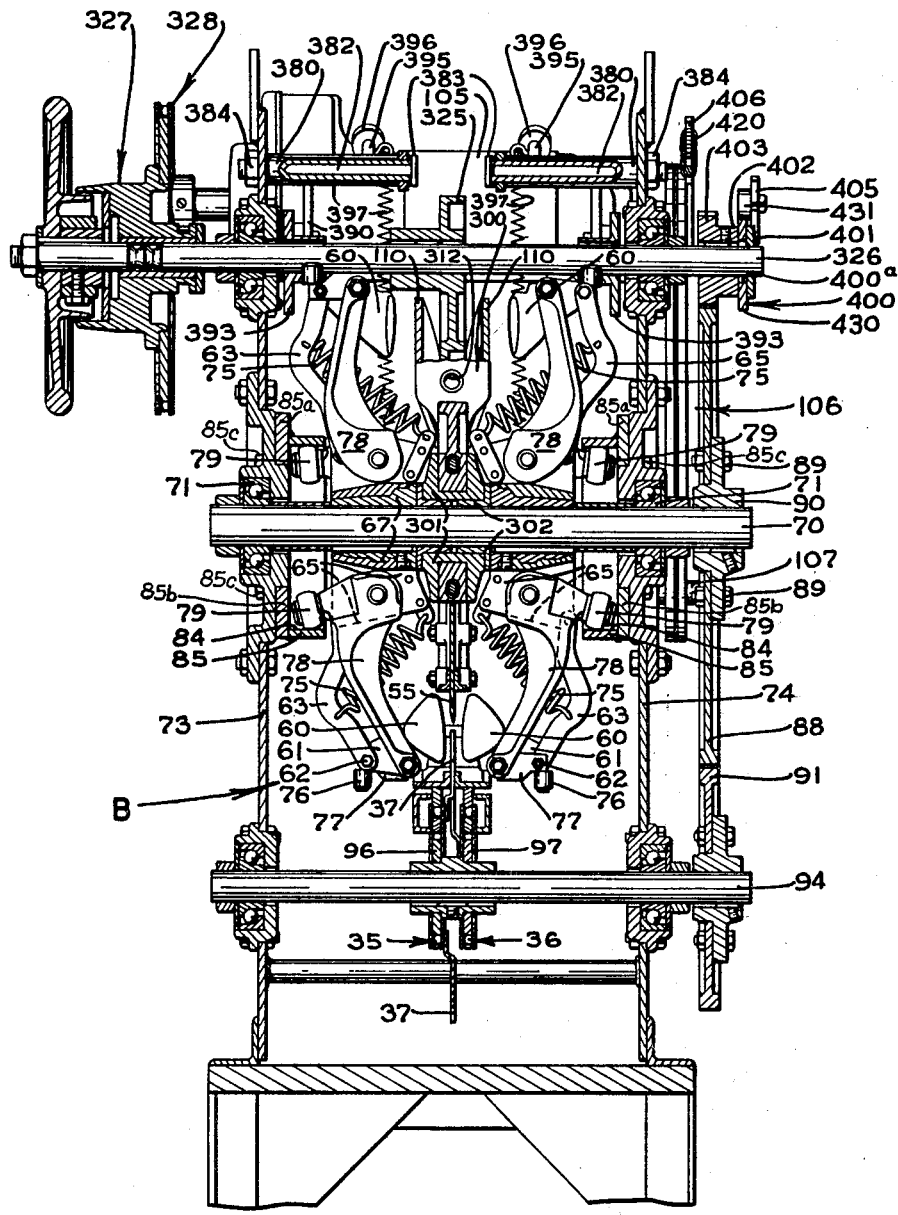

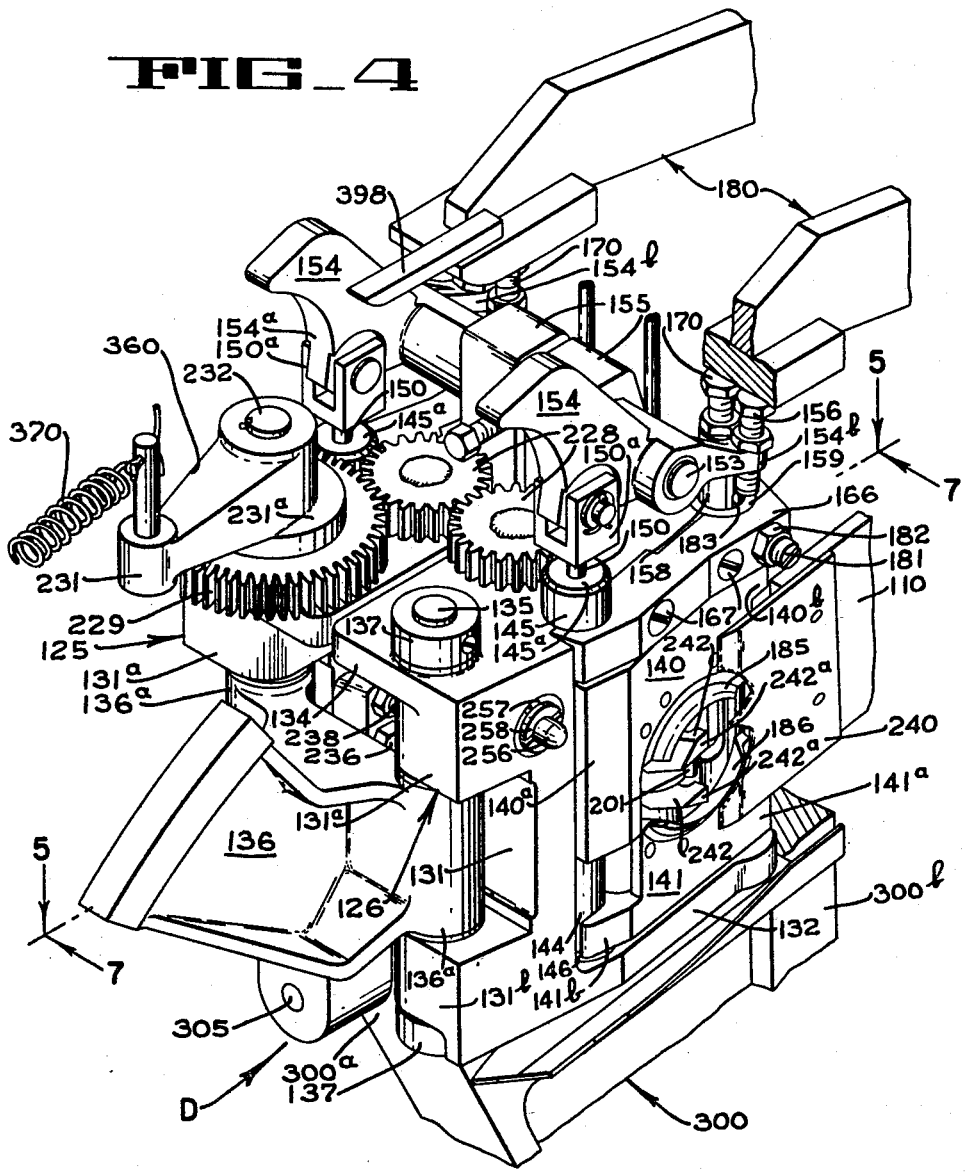

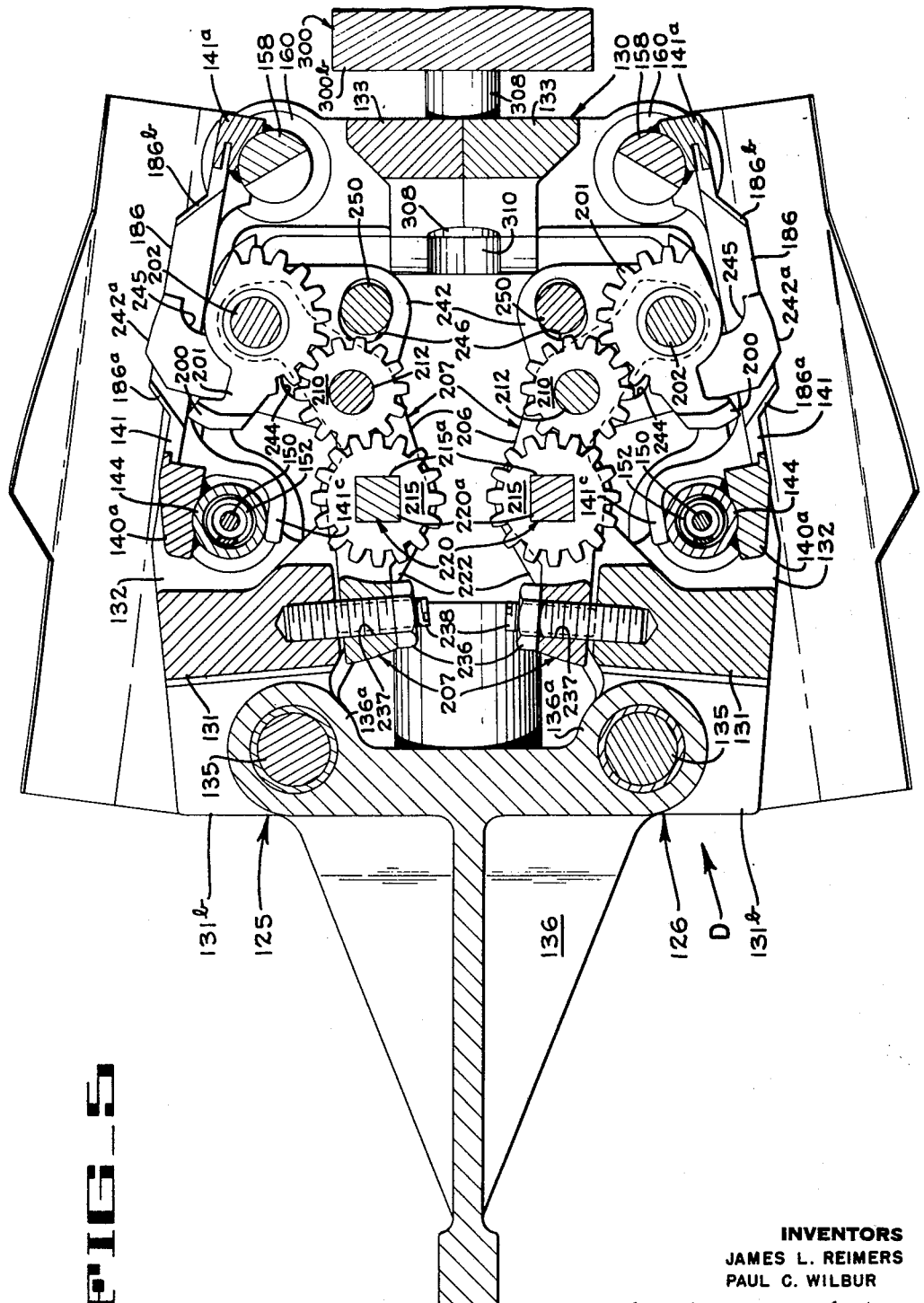

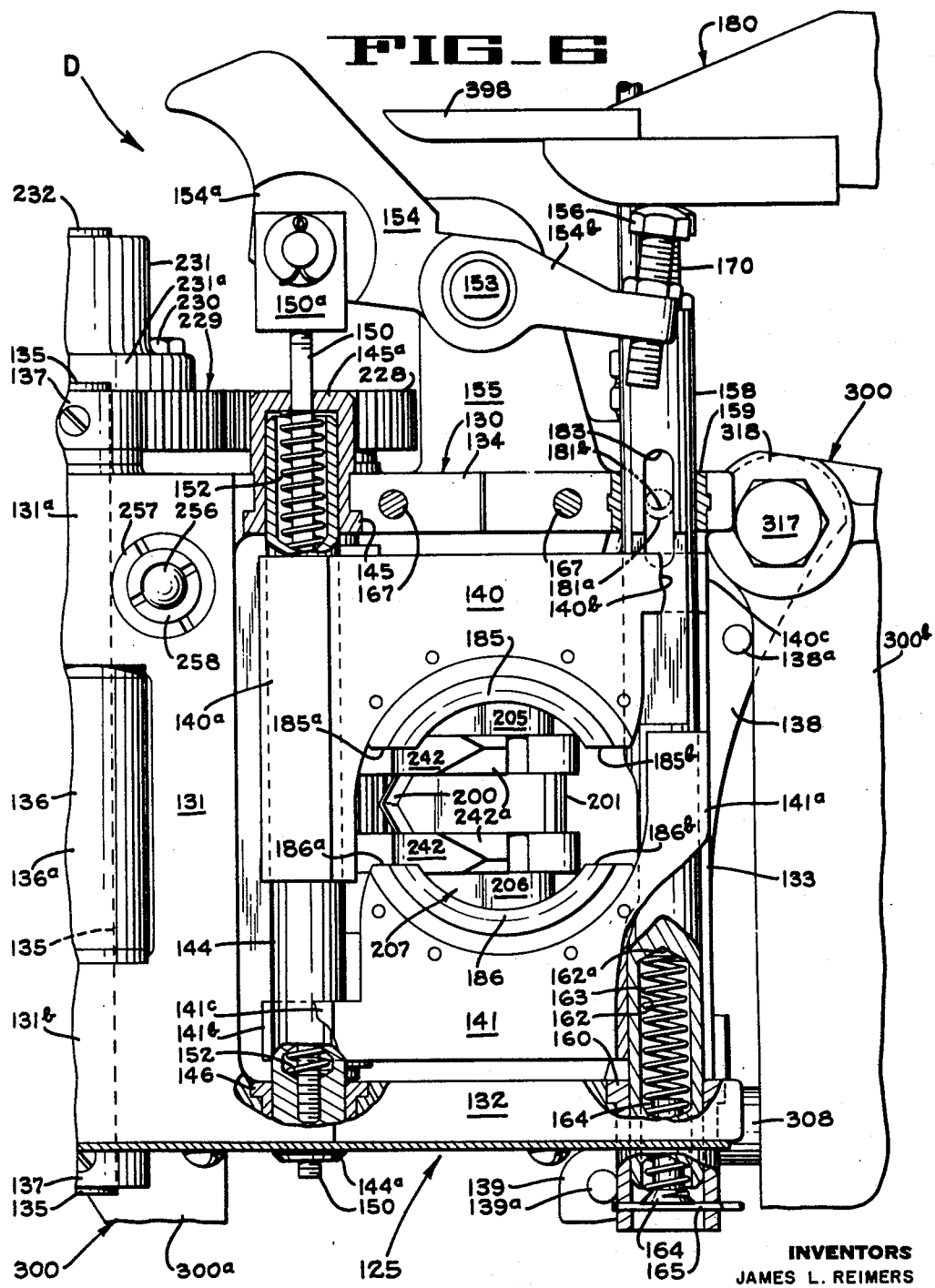

May 12, 1964 J. L. REIMERS ETAL 3,132,675
DRUPE PITTER
Original Filed June 10, 1957 14 Sheets-Sheet 7
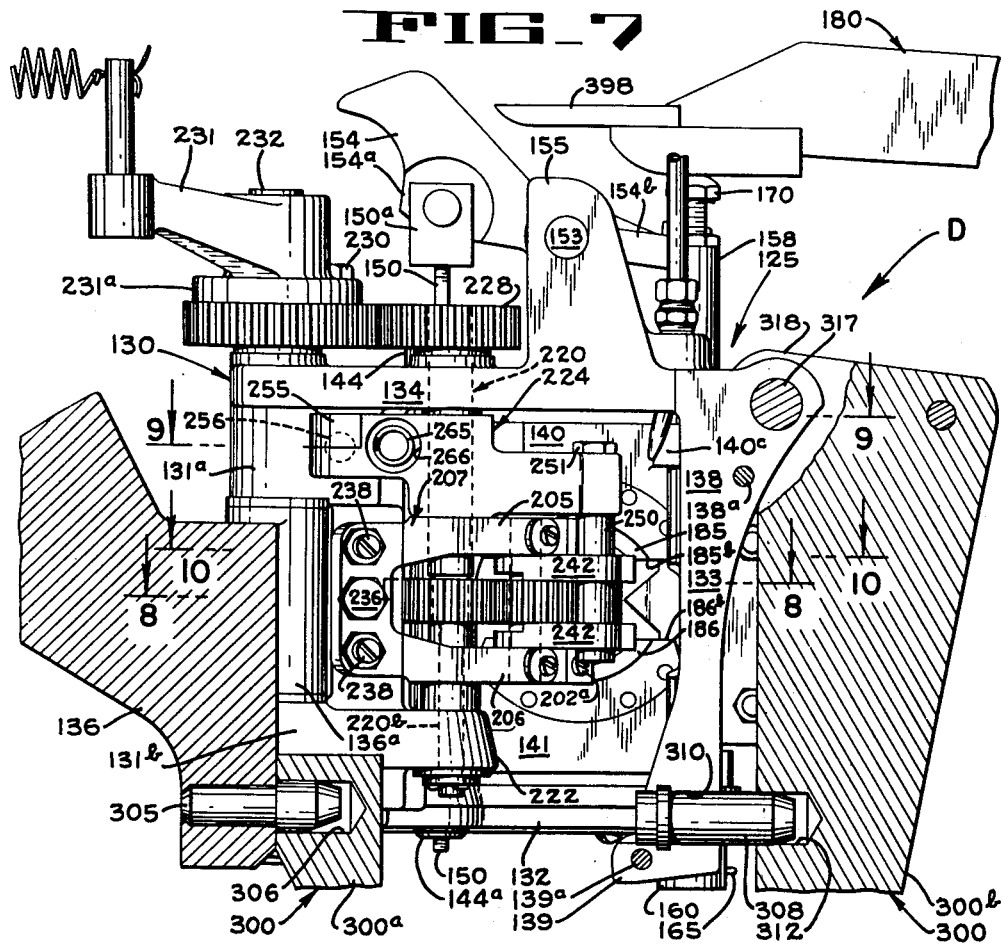
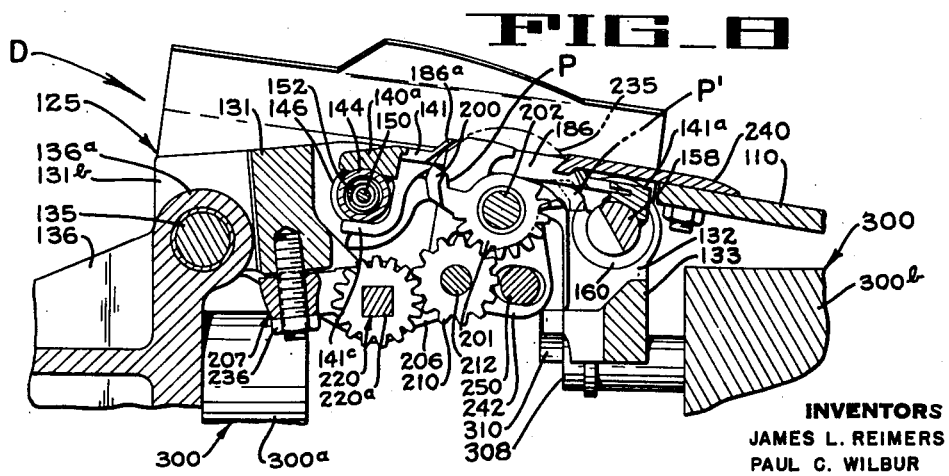
INVENTORS
JAMES L. REIMERS
PAUL C. WILBUR
BY Hans G. Hoffmeister
ATTORNEY

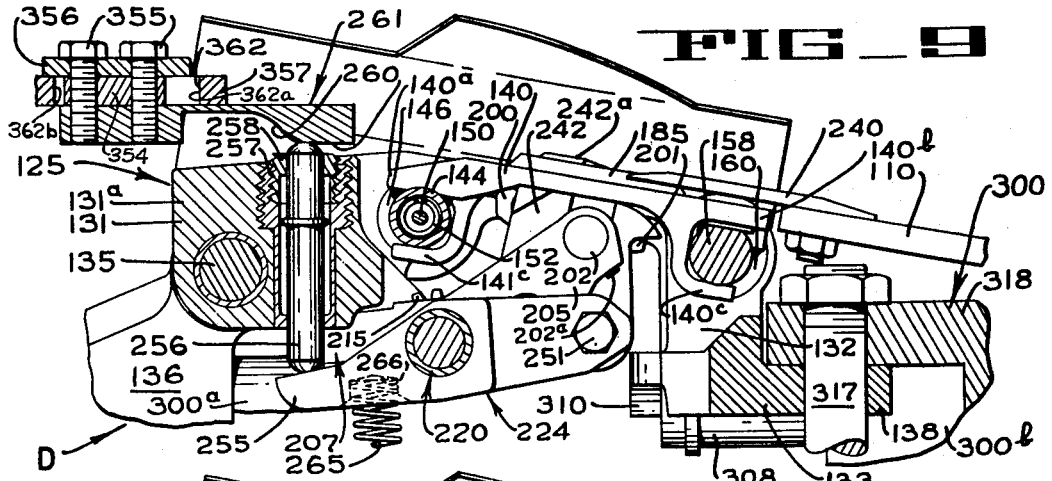
FIG_9
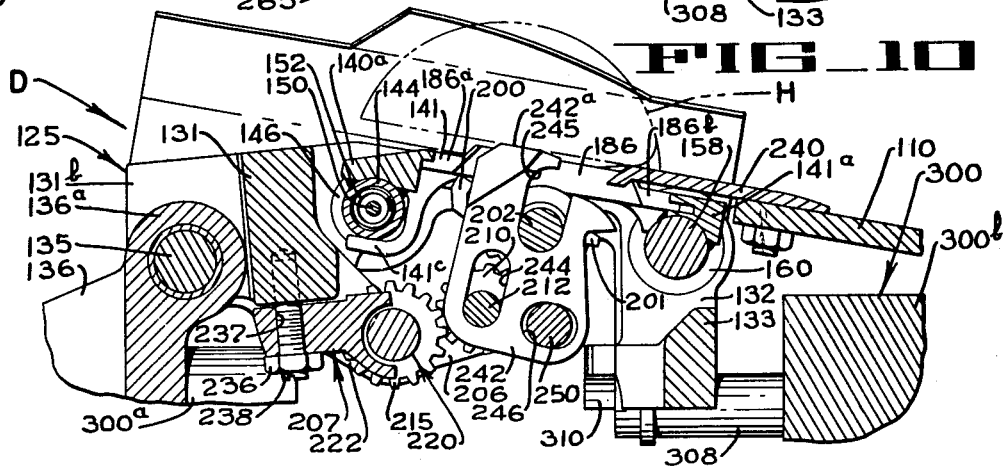
FIG_10
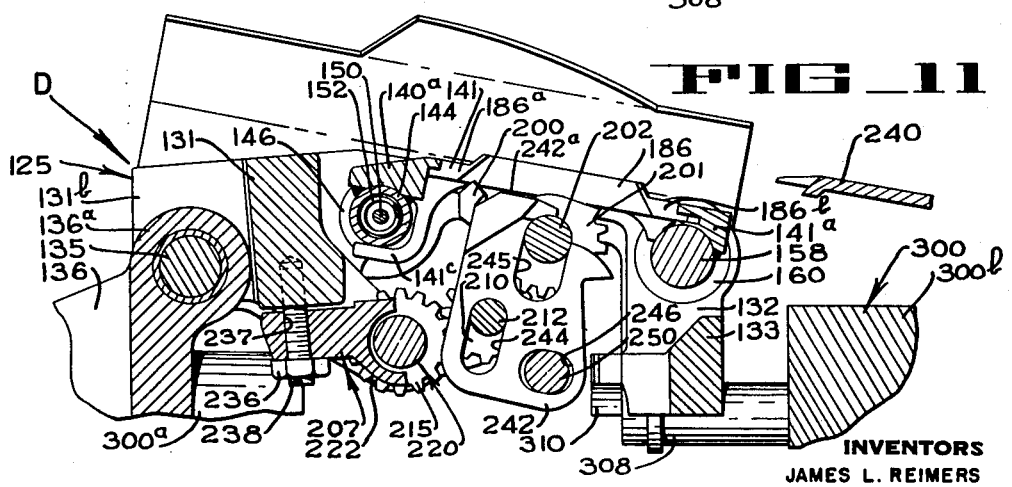
FIG_11
INVENTORS
JAMES L. REIMERS
PAUL C. WILBUR
BY Hans G. Hoffmeister
ATTORNEY

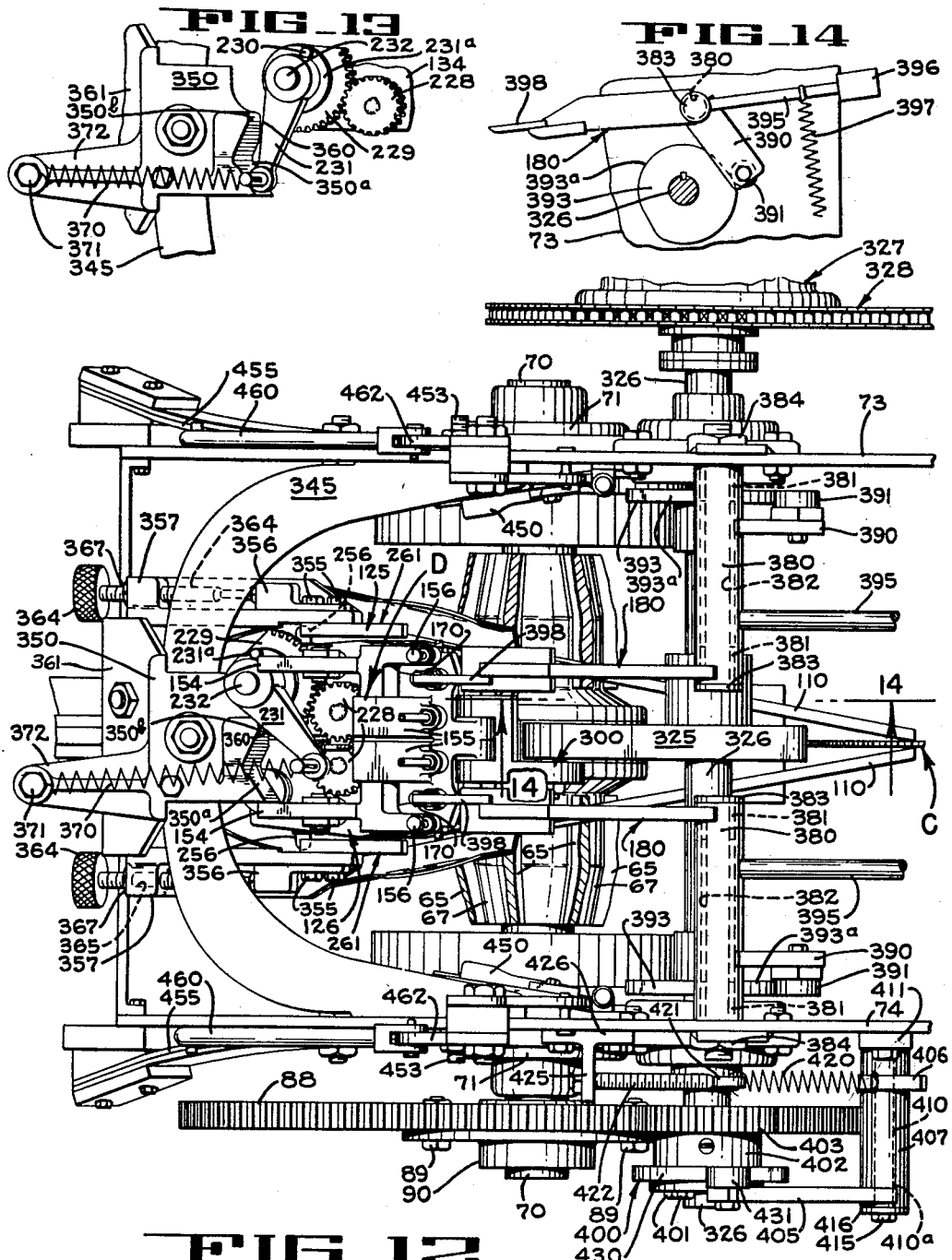

May 12, 1964   J. L. REIMERS ETAL   3,132,675
DRUPE PITTER
Original Filed June 10, 1957   14 Sheets-Sheet 10
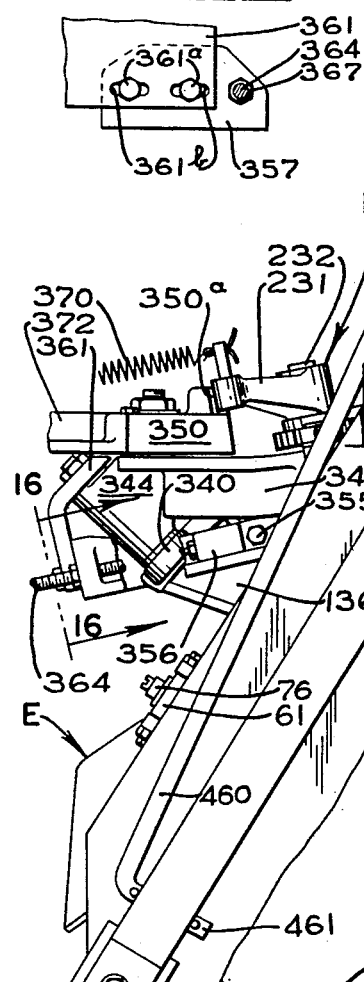
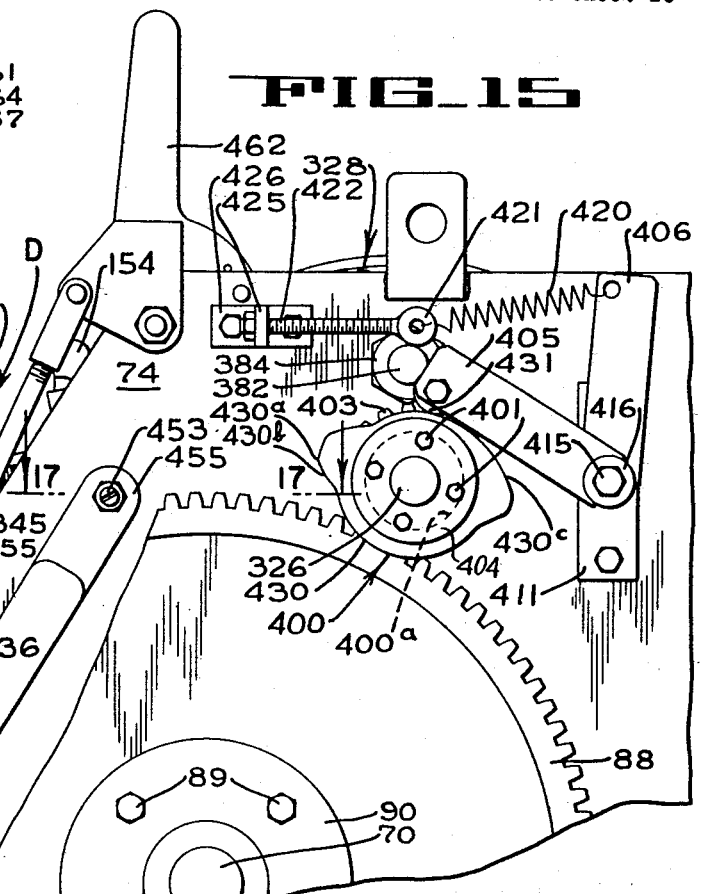
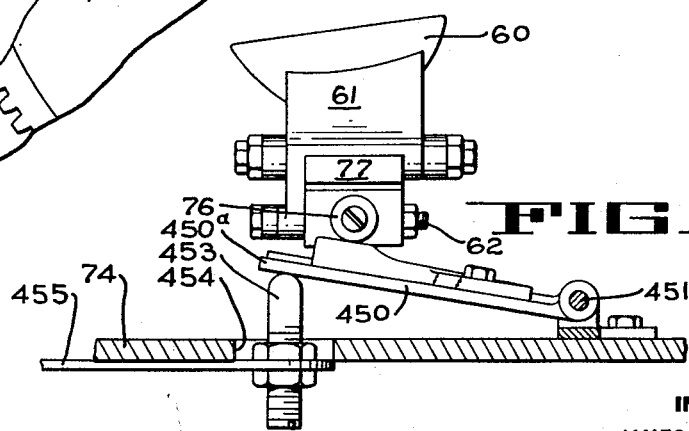
INVENTORS
JAMES L. REIMERS
PAUL C. WILBUR
BY *Hans G. Hoffmeister*
ATTORNEY May 12, 1964    J. L. REIMERS ETAL    3,132,675
DRUPE PITTER
Original Filed June 10, 1957    14 Sheets-Sheet 11
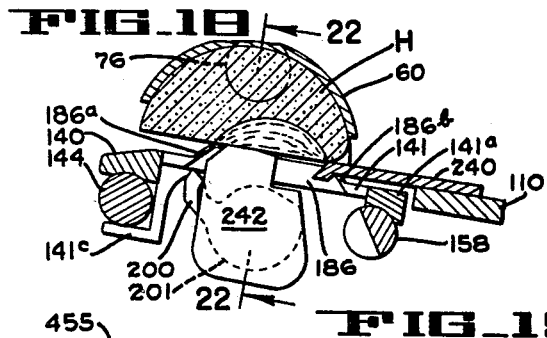
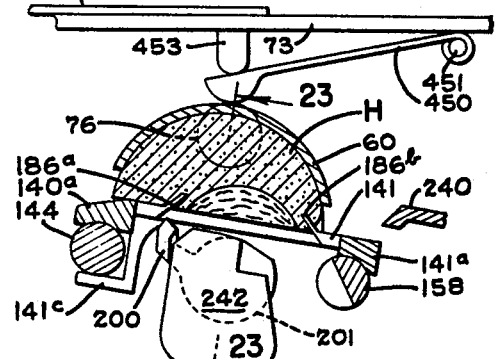
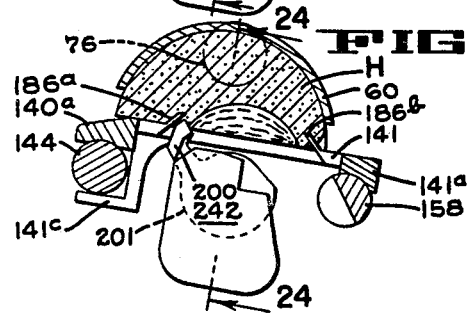
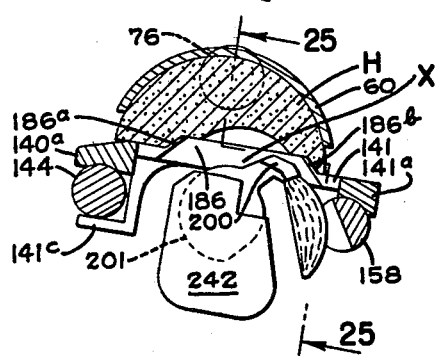
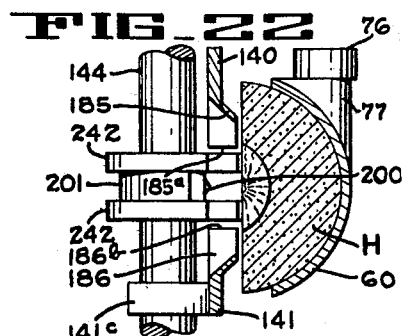
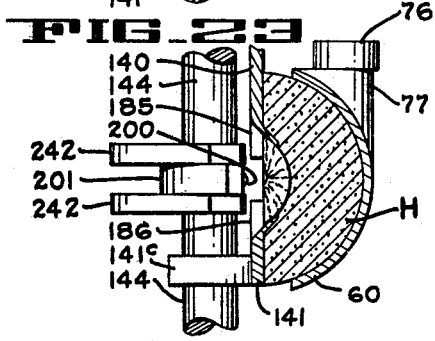
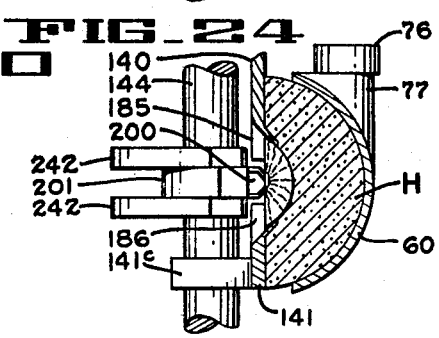
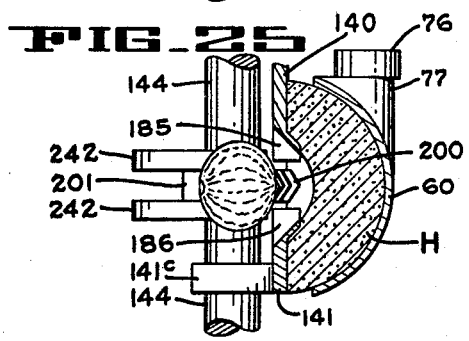
INVENTORS
JAMES L. REIMERS
PAUL C. WILBUR
BY Hans G. Hoffmeister
ATTORNEY

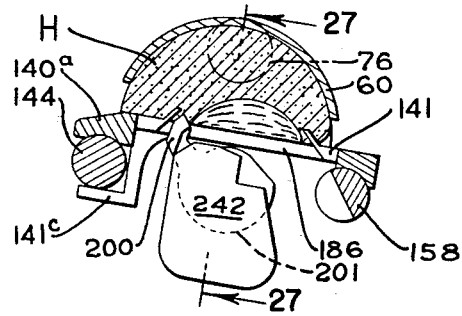
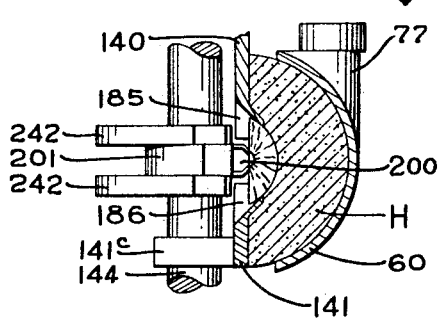
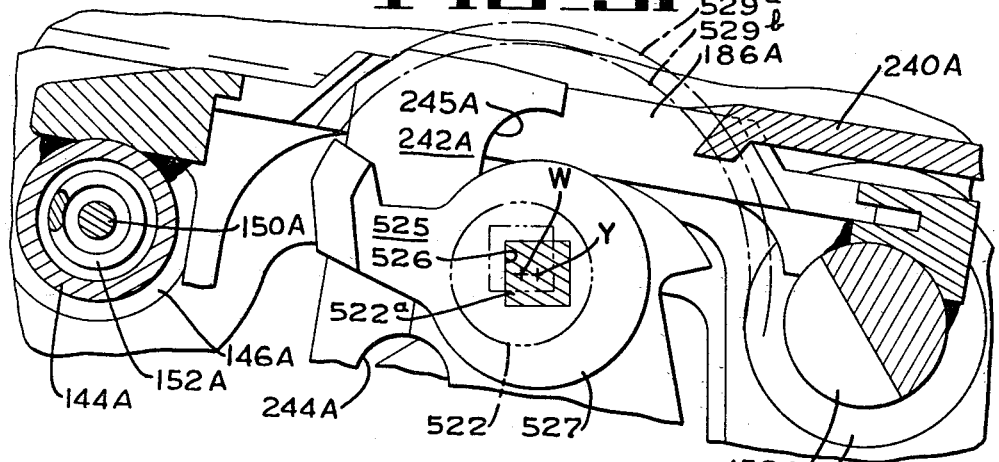
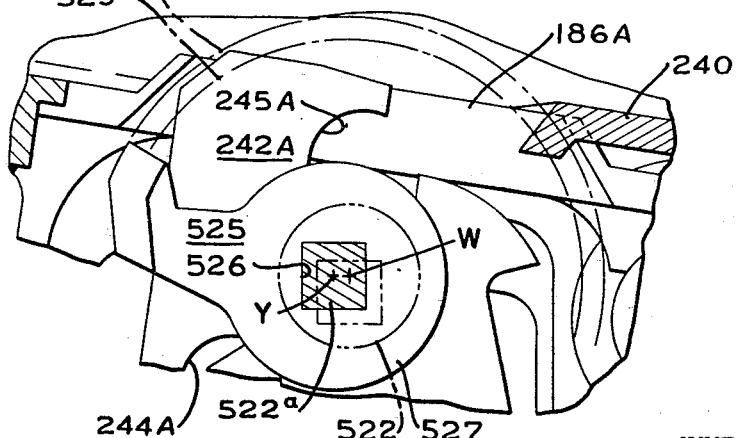

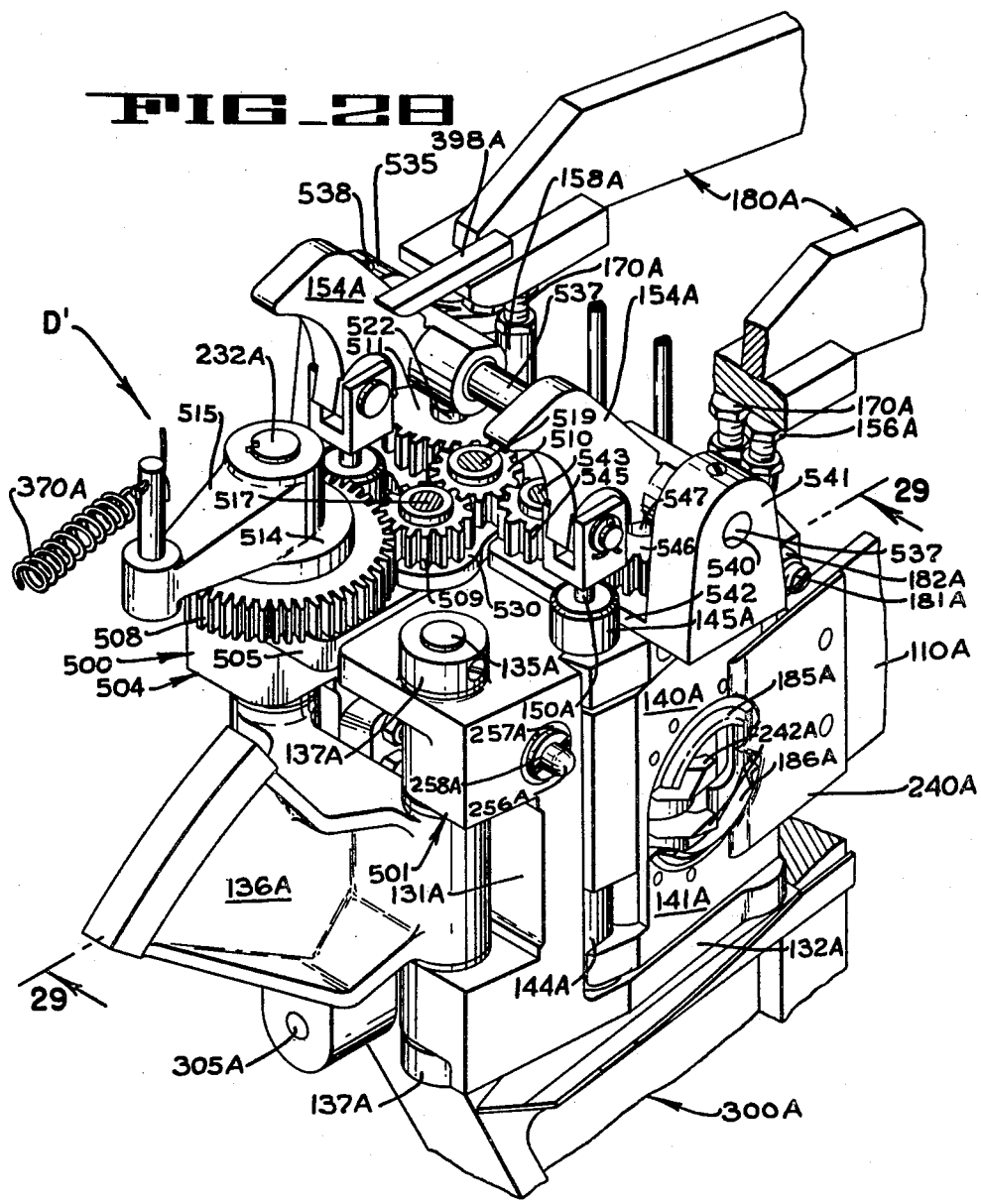

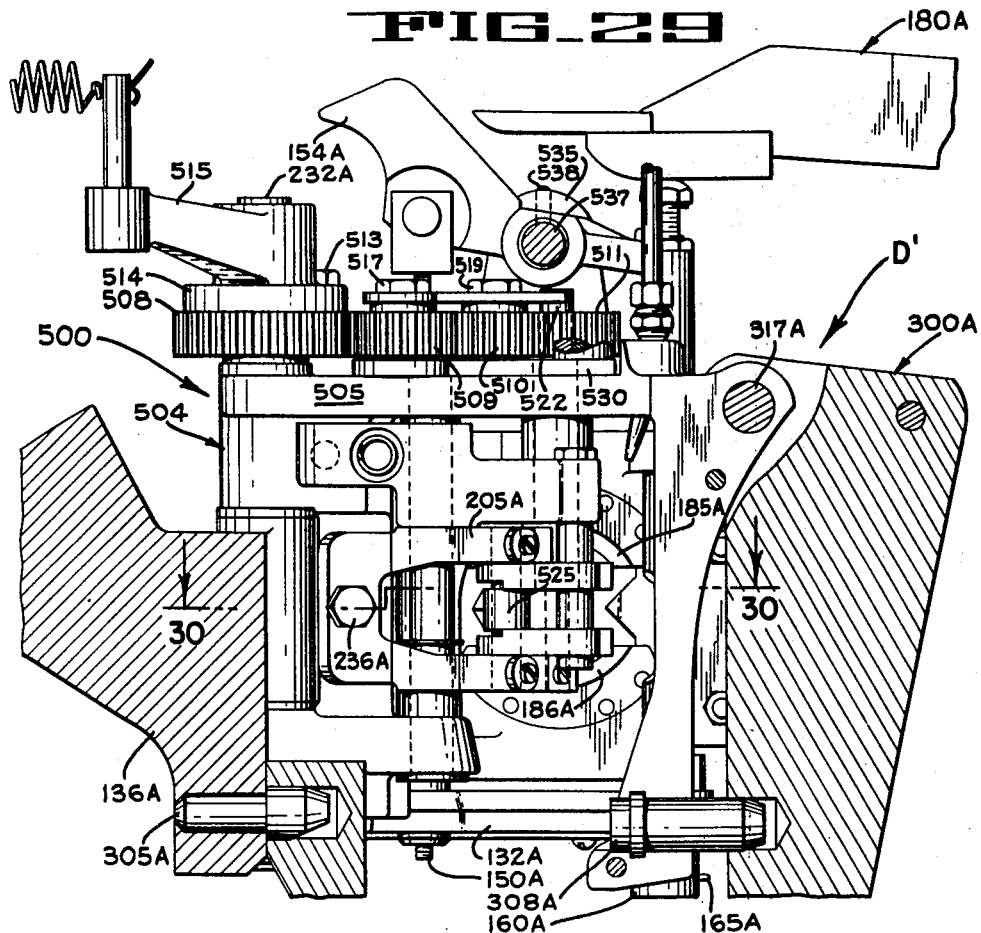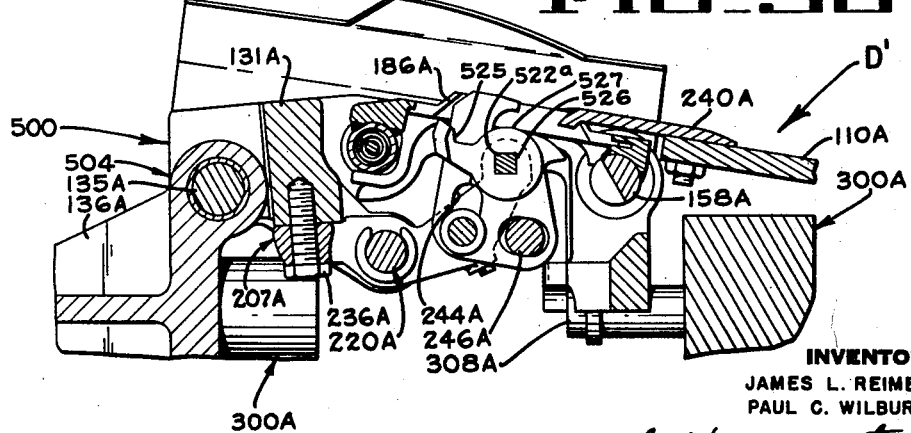

United States Patent Office 3,132,675
Patented May 12, 1964

3,132,675
DRUPE PITTER
James L. Reimers, Hoopeston, Ill., and Paul C. Wilbur, San Jose, Calif., assignors to FMC Corporation, a corporation of Delaware
Original application June 10, 1957, Ser. No. 664,711. Divided and this application July 21, 1958, Ser. No. 749,777
21 Claims. (Cl. 146—28)

The present application is a division of the copending joint U.S. application of John Boyce, James L. Reimers, and Paul C. Wilbur, Serial No. 664,711, filed June 10, 1957.

This invention pertains to fruit preparation machines and more particularly to a method of pitting peaches and an apparatus for carrying out the method.

At present, in preparing peaches for canning, the pits are generally removed from peaches by cutting the peach in half and then making a cut entirely around the pit. In this method of pitting, the pit and a substantial portion of the meat adjacent the pit are removed, leaving a clean-cut cavity. It has recently been found that, if a portion of the meat that is closely adjacent the pit is left in the cavity after the pit has been removed, the yield is increased, since less meat is wasted and the cavity has a desirable freestone appearance. It is therefore an object of the present invention to provide a method of pitting peaches whereby a portion of the meat that is contiguous to the pit remains in the cavity after the pit has been removed.

Another object is to provide an improved method of removing a pit segment from a peach half.

Another object is to provide an improved apparatus for removing pits from peaches.

Other and further objects will become apparent from the following description taken in connection with the accompanying drawings, in which:

FIG. 1 is a perspective of the peach pitting machine of the present invention.

FIG. 2 is a fragmentary, enlarged, vertical section taken longitudinally through the pitting machine substantially along line 2—2 of FIG. 1.

FIG. 3 is a vertical section taken on line 3—3 of FIG. 2.

FIG. 4 is an enlarged perspective of the pitting head and a portion of the machine that supports the head.

FIG. 5 is a horizontal section taken on lines 5—5 of FIG. 4.

FIG. 6 is an enlarged fragmentary side elevation, partly broken away and partly in section, of the head of FIG. 4.

FIG. 7 is a fragmentary vertical section taken on line 7—7 of FIG. 4.

FIG. 8 is a fragmentary horizontal section taken on line 8—8 of FIG. 7.

FIG. 9 is a fragmentary horizontal section taken on line 9—9 of FIG. 7.

FIG. 10 is a fragmentary horizontal section taken on line 10—10 of FIG. 7.

FIG. 11 is a fragmentary horizontal section, similar to FIG. 10, but showing some of the operating parts in an actuated position.

FIG. 12 is a fragmentary top elevation of the machine with parts in section and parts broken away to more clearly disclose the mechanism.

FIG. 13 is a fragmentary plan of a camming mechanism shown in FIG. 12 with the parts shown in an operating position different than the position shown in FIG. 12.

FIG. 14 is a vertical section taken on line 14—14 of FIG. 12.

FIG. 15 is an enlarged side elevation of a portion of the machine of FIG. 1.

FIG. 16 is a fragmentary section taken on line 16—16 of FIG. 15.

FIG. 17 is a horizontal section taken on line 17—17 of FIG. 15.

FIGS. 18, 19, 20 and 21 are fragmentary diagrammatic horizontal sections taken through the pitting unit and showing consecutive positions of the apparatus during the pitting of a peach half.

FIGS. 22, 23, 24 and 25 are diagramamtic vertical sections taken on line 22—22 of FIG. 18, line 23—23 of FIG. 19, line 24—24 of FIG. 20, and line 25—25 of FIG. 21, respectively.

FIG. 26 is a fragmentary diagrammatic horizontal section, similar to FIG. 20, but showing the different adjusted positions of the parts.

FIG. 27 is a diagrammatic vertical section taken on line 27—27 of FIG. 26.

FIG. 28 is a fragmentary perspective of a second embodiment of the pitting head of the present invention.

FIG. 29 is a vertical section taken on line 29—29 of FIG. 28.

FIG. 30 is a fragmentary horizontal section taken on line 30—30 of FIG. 29.

FIGS. 31 and 32 are enlarged fragmentary horizontal sections, similar to FIG. 30, but showing different operating positions of the pitting hook.

The peach pitting machine of the present invention comprises a peach feeding mechanism A (FIGS. 1 and 2) which is adapted to receive peaches one at a time and deliver them rearwardly to a rotary peach transfer mechanism B. The transfer mechanism B removes the peaches from the feed mechanism, carries them across a saw C, and then upwardly and forwardly to a pitting head D where the pit half is removed from each peach half as the pitting unit carries the peach halves toward a discharge chute E.

The peach feeding mechanism A includes a pair of endless chain conveyors 35 and 36, each of which carries a plurality of spaced impaling blades 37. The conveyors 35 and 36 diverge at their forward ends to provide spaced feed stations 39 and 40 near which operators stand as they impale a peach on each blade 37. As the conveyors move rearwardly they are guided into closely adjacent parallel positions so that the sharpened outer edge portions 41 of the blades 37, which are offset as seen in the lower portion of FIG. 3, are disposed in the same vertical plane. Each blade 37 has a recess 42 (FIG. 2) adjacent the sharpened edge 41 and a locating head or projection 43 adjacent the recess. The operator grasps the peach with both hands, adjusts the peach until its suture plane is vertical, and then holds the peach in a position such that the locating projection 43 of the blade enters the indentation at the stem end of the peach. When the projection 43 has entered the stem end of the peach the operator imparts a downward pivoting movement to the peach, causing the peach to be firmly impaled on the blade 37 with the longitudinal axis of the pit disposed in a substantially horizontal plane, as indicated in phantom lines in FIG. 2. As the peach is carried toward the saw C it passes between a pair of pivotally mounted centering rollers 50 which are interconnected by meshing gear segments 51. A rotatable skin severing disc 52 is mounted in the vertical plane of the blades 37 immediately behind the centering rollers 50. The disc 52 cuts the flesh of the peach in the plane of the suture so that the peach can be moved onto an adjacent elongated stationary impaling blade 55 without any rotation of the peach taking place. As each peach is conveyed along the stationary blade 55, it is engaged by opposed cups 60 (FIGS. 2 and 3) of the transfer mechanism B.

The transfer mechanism B comprises a plurality of pairs of opposed cups 60, each cup being mounted on a rigid arm 61 (FIG. 3) that is pivotally connected by a bolt 62 to a cup-support arm 63. Each arm 63 is pivoted on a flange 65 that projects generally radially outwardly from a tubular support member 67 that is keyed to a shaft 70 journalled for rotation in bearings 71 disposed in side wall members 73 and 74 of the machine. A spring 75 is connected between the radial flange 65 and the cup-support arm 63 to normally urge the cup inwardly toward the path of movement of the impaling blades 37. A roller 76 is mounted for rotation on a block 77 that is secured by the bolt 62 to the rigid arm 61. A cup-actuating bell-crank lever 78, which is also pivoted on the flange 65, carries a rotatable cam follower 79 at one end and is pivotally connected at its other end to the rigid cup arm 61. The cam follower 79 of each cup-actuating lever 78 is arranged to ride on an internal camming surface 84 of an adjustable cylindrical cam 85, one of which is mounted in fixed position on each of the side walls 73 and 74. The cylindrical cam 85 is made in two sections, each of which is welded to a flange 85a or 85b. Bolts 85c pass through oversize holes in the flanges 85a and 85b to secure the flanges to the side walls. Radial guide slots (not shown) are provided to limit the adjusting movement to movement in a radial direction. The camming surfaces 84 are so designed that the cups of each opposed pair of cups are periodically moved toward each other to engage a peach and are subsequently moved away from each other to discharge the peach at a point above the discharge chute E. In FIG. 3 it will be seen that the shaft 70 is driven by a gear 88 which is adjustably secured thereon by bolts 89 that extend through slots (not shown) in the gear 88 and through a hub 90 keyed to the shaft. The gear 88 is in mesh with a gear 91 that is secured to a shaft 94 which drives the endless chain conveyors 35 and 36 through sprockets 96 and 97, respectively. With this arrangement, the movement of the cups can be coordinated with the movement of the impaling blades 37 so that the cups of each pair of cups will move inwardly toward each other at a predetermined time to grasp a peach being advanced on a particular impaling blade 37.

The peach is gripped between the opposed cups 60 and is moved toward the rear of the machine where it is removed from the impaling blade 37 and is carried over a curved flesh-separating blade 99 (FIG. 2) and over an upwardly curved flesh-separating portion 100 of the elongated blade 55. As the cups 60 continue to move, they cause the peach to pass over the rotatable saw blade C which is mounted in the vertical plane of the blades 37 and 55 and is keyed to a shaft 101 that is journalled in a bearing 102 supported from the rear wall 103 of the machine. The saw shaft 101 is driven from a main motor 105 (FIG. 2) through a belt and pulley arrangement 106 (FIG. 1) that is connected between the motor shaft 107 and the saw shaft 101.

Immediately following the severing of the flesh and the pit of the peach into halves, the two halves of the peach pass onto the outer surfaces of two guide plates 110 (FIGS. 2 and 3), which lie closely adjacent the sides of the saw blades C and diverge away from the blade to separate the peach halves as the halves are moved upwardly along the plates. Each peach half is thus supported between a cup 60 and the surfaces of one of the guide plates 110 and is moved over this surface to the pitting head D.

The pitting head D (FIGS. 4 and 5) comprises two units 125 and 126 which are substantially identical but have their elements facing in opposite directions. Accordingly, a description of the parts of either unit will be sufficient to explain the construction of both units and, in the description, the identical parts of the units will be given identical reference numerals.

Each of the units has a frame 130 (FIG. 6) consisting of a forward wall 131, a bottom wall 132, a rear wall 133 and a top wall 134. The forward wall 131 (FIGS. 4 and 6) of each unit has two apertured hubs 131a and 131b which receive a shaft 135 that also extends freely through a hub 136a formed on a mounting plate 136. Collars 137 are secured to the upper and lower ends of the shaft 135 to prevent axial movement thereof. With this arrangement both of the units 125 and 126 are pivotally mounted on the same plate 136 for swinging movement toward and away from each other. At the rear of the frame, a hole 138a is provided in a flange 138 projecting from the rear wall 133, and a hole 139a is provided in a flange 139 depending from the lower end of the rear wall 133. The holes 138a of the two units are in alignment, as also are the two holes 139a, and each pair of aligned holes is arranged to receive a bolt to lock the two units together to provide a rigid unit.

The walls of the frame 130 of each unit define a central opening that is closed by two irregularly-shaped sliding cutter-support plates 140 and 141 (FIGS. 4 and 6). The upper plate 140 has a side portion 140a welded to a tube 144 that is journalled for sliding movement in bushings 145 and 146 which are disposed in the upper wall 134 and the lower wall 132, respectively, of the frame 130. An actuating rod 150 extends through the tube 144 and is threaded in the lower closed end 144a thereof. A spring 152 is disposed in the tube 144, around the rod 150. At its lower end, the spring 152 abuts the inner end face of the tube end 144a, and at its upper end it abuts an end wall 145a of the bushing 145. The upper end of the rod 150 is threaded into a yoke 150a that is pivotally connected to an arm 154a of a lever 154 that is rotatably mounted on a shaft 153 fixed in a boss 155 projecting upwardly from the top wall 134 of the frame 130. The lever 154 also has an arm 154b in which a capscrew 156 is adjustably secured. When the lever 154 is pivoted clockwise (FIG. 6), the rod 150 and the plate 140, carried thereby, are raised. As the rod 150 moves upwardly the spring 152 is compressed so that, when the force that caused the pivoting of the lever 154 is withdrawn, the spring will return the plate 140 to its lower position. The plate 140 is guided in its vertical movement by two spaced arms 140b and 140c which are integrally formed on the right side edge (FIG. 6) of the plate 140 and are disposed on opposite sides of a rod 158 that is mounted for sliding movement in upper and lower fixed bushings 159 and 160, respectively, carried by the frame 130. The abutment of the bottom surface of the yoke 150a with the bushing 145 may be used to define the lowermost position of the plate 140.

The lower plate 141 has a portion 141a at its right side, welded to the rod 158, and two spaced arms 141b and 141c integrally formed on its left side and disposed on opposite sides of the tube 144. A deep recess 162 is formed in the lower end of the rod 158 to receive a spring 163 which is disposed between the end wall 162a of the recess and the head of a pin 164 which projects up into the recess. Downward movement of the pin 164 is resisted by a cotter pin 165 which is secured across the lower end of the fixed bushing 160. A bar 166 (FIG. 4) is secured by capscrews 167 to the top wall 134 to lock the bushings 145 and 159 therein. At its upper end, the rod 158 has a capscrew 170 (FIG. 6) adjustably secured therein. When a downward force is applied to the head of the capscrew 170, the rod 158 and the plate 141 are moved downwardly. During the downward movement of the rod 158, the spring 163 is compressed so that, when the force is removed from the upper end of the rod 158, the spring 163 will return the rod 158 and the plate 141 to its upper position. A lever 180 is arranged to engage the capscrew 170 to move the plate 141 downward, at the same time that it engages the capscrew 156 on the lever 154 to pivot the liver 154 clockwise and raise the plate 140.

A stud 181 (FIG. 4) is locked in adjusted position in an opening (not shown) in bar 166 of the frame by a nut 182. The inner end 181a of the stud is shown in dot-dash lines in FIG. 6 and includes an eccentric curved abutment wall 181b that extends into a slot 183 in the rod 158. This eccentric wall may be used to limit the upward movement of the plate 141 since the wall that defines the lower end of slot 183 will contact the abutment wall 181b during upward movement of the plate 141.

The plates 140 and 141 have arcuate cutting edges 185 and 186, respectively. When the plates 140 and 141 are moved from the open position of FIG. 6 to a closed position, flat edges 185a and 185b adjacent the curved edge 185 abut flat edges 186a and 186b adjacent the curved edge 186. In this position, the spaced confronting edges 185 and 186 define a pitting opening. As seen in FIGS. 4 and 5, the curved edges 185 and 186 are disposed outwardly from the plane of the plates 140 and 141. During the pitting operation, which will be explained more fully hereinafter, the cutter-support plates 140 and 141, which together with the cutting edges form cutter units, are moved to open position and a peach half is positioned close to the plates 140 and 141 with the pit side of the peach half facing the opening defined by the curved edges 185 and 186. At a predetermined time, pressure is applied to the peach half to force it toward the plates. At the same time, the plates are allowed to be moved, by their springs 152, and 163, to closed position. The upper edge 185 is thus moved downwardly and inwardly into the peach half and the lower edge 186 is moved upwardly and inwardly. When the plates 140 and 141 reach closed position, the cutting edges have moved in behind the pit. It will be evident that when the plates are closed, the pit will still be connected to the main meat portion of the peach half over an area approximately equal to the area of the opening defined by the arcuate edges 185 and 186. If the pit is slightly off center, the cutting edges act as pit finders which engage and tend to center the pit.

A pit striker or ejector in the form of a hook 200 (FIG. 6) is mounted in each unit midway between the cutting edges of the pit finders 185 and 186. The hook 200 of the unit 125 will be described with particular reference to FIGS. 5, 7 and 8, wherein it will be seen that the hook is integrally formed on a gear segment 201 which is mounted for rotation on a shaft 202 that is secured by setscrews 202a (FIG. 7) between two spaced arms 205 and 206 of a rigid yoke 207. The gear segment 201 is in mesh with a gear 210 (FIG. 8) which is freely rotatable on a second shaft 212 that is secured between the arms 205 and 206 of the yoke 207. A gear 215, which is in mesh with the gear 210, has a square central opening 215a, that receives a square shank portion 220a of a shaft 220 which has a lower end 220b (FIG. 7) journalled for rotation in a boss 222 of the frame 130. The shaft 220 projects upwardly from the boss 222 through the yoke arms 206 and 205, through an actuating lever 224, and through the top wall 134 of the frame 130. A gear 228, which is welded on the upper end of the shaft 220, meshes with a gear segment 229 that is secured by a capscrew 230 to the hub 231a of a lever 231. The gear segment 229 is freely rotatable on an upper extension 232 of the pivot shaft 135 of unit 125, while the hub 231a is keyed to the shaft extension. Since the gears 228 of the two pitting units 125 and 126 are in mesh (FIG. 4), the pitting hook of each unit will be actuated when the lever 231 is pivoted.

When the lever 231 is pivoted in a direction to rotate the shaft extension 232 and the shaft 135 counterclockwise (FIG. 8), the hook 200 is swung in a clockwise direction from the solid line position P of FIG. 8 to the phantom line position P'. The phantom line 235 indicates the path of movement of the outer end of the hook. The actuation of the hook is coordinated with the operation of the pit finders 185 and 186 so that the hook engages the pit immediately after the cutting edges of the pit finders close behind the pit.

It is desirable that the path 235 of the hook 200 be as close as possible to the inner surface of the cutting edges of the pit finders 185 and 186 without contacting the edges. In order that the most advantageous position of the hook can be obtained, the yoke 207 is adjustably secured to the forward wall 131 of the frame 130 by means of a capscrew 236 (FIG. 5) that extends freely through an opening 237 in the yoke 207 and is threaded in a tapped opening in the wall 131. A pair of setscrews 238 (FIG. 7) are threaded through the yoke above and below the capscrew 236. The setscrews 238 bear against the face of the front wall 131 and lock the yoke in the adjusted position that is determined by the capscrew 236.

When a peach half is initially moved into position on the pitting unit by a cup 60, the peach is supported jointly by a guide plate 240 (FIGS. 2 and 8), that is secured on the upper end of each guide plate 110, and by two identical, spaced pit stops 242 (FIGS. 7 and 8). Each pit stop 242 is a relatively flat member that has two guide slots 244 and 245 (FIG. 10) and a generally oval opening 246 formed therein. The opening 246 receives an actuating pin 250 which is secured by a capscrew 251 (FIG. 7) in depending relation on one end of the previously mentioned actuating lever 224. The lever 224 (FIG. 9) has an arm 255 which bears against one end of a push rod 256 that is slidably supported in adjustable bushings 257 and 258. The other end of the push rod bears against a camming surface 260 of an adjustable cam 261 so that, before the pitting operation begins, the lever 224 is held in the pivoted position of FIGS. 9 and 10 wherein the pit stops 242 project through the opening provided between the cutting edges of the pit finders 185 and 186, and the outer flat faces 242a of the pit stops lie in a plane spaced outwardly of the plane of the cutting edges. Accordingly, when the peach half H (FIG. 10) is first positioned on the pitting head D it rests on the two pit stops 242 and the guide plate 240.

After a peach half is positioned on the pitting head, the head is moved toward the left as viewed in FIG. 9. As the head moves toward the left it is accelerated until it reaches substantially the speed at which the peach half is being advanced by the cup 60. The mechanism for actuating the head will be described presently. As the head moves toward the left, the peach half begins to move off the guide plate 240 and the push rod 256 rides off the camming surface 260, permitting the lever 224 of the unit 125 to be pivoted clockwise by a spring 265 that is disposed in opposed recesses 266 in the arm 255 of lever 224 and in an identical aligned recess in the arm 255 of lever 224 of unit 126. It will be understood that, since the elements of the units 125 and 126 are oppositely disposed, the lever 224 of unit 126 will be pivoted counterclockwise when its push rod rides off the associated camming surface 260. When the lever 224 (FIG. 9) is pivoted clockwise, the two pit stops 242 are retracted, allowing the peach half to move inwardly as pressure is applied to the outer side of the peach half. In this manner, the peach half is moved inwardly while the pit finders 185 and 186 are closing, as previously explained. When the pit is gripped by the pit finders, the pitting hook 200 is actuated to engage the pit, tear it away from the flesh of the peach half, and flip it inwardly into the central chamber defined between the two units 125 and 126.

The pitting head D is mounted on a cradle 300 (FIG. 2) which has a hub 301 (FIG. 3) mounted for free rotation on the transverse shaft 70 by means of a bushing 302. The mounting plate 136 (FIG. 7) of the pitting head has a stud 305 near its lower end that fits into a recess 306 in an arm 300a of the cradle 300, and a second stud 308, which is locked in complementary recesses 310 of the rear walls 133 of the frames 130 of units 125 and 126, projects into a recess 312 in an arm 300b of the cradle. The head D is locked on the cradle by means of a bolt 317 which projects through the apertures of the rear wall flanges 138 and through an aperture in each flange of a pair of flanges 318 (FIGS. 6 and 7) in the arm 300b of the cradle. Accordingly, when the cradle 300 is pivoted on the shaft 70, the head D is moved in an arcuate path at the radially outer end of the cradle arms 300a and 300b.

The cradle 300 is pivoted relative to the shaft 70 by means of a cam 325 (FIG. 2) that is keyed to a shaft 326 extending transversely between the side walls 73 and 74 (FIG. 3) of the machine. The shaft 326 is driven from the main motor 105 through a clutch 327 and a sprocket and chain drive 328. The cam 325 has a cam track 330 (FIG. 2) adapted to guide a roller follower 331 which is mounted on the cradle arm 300b by a bolt 333. The cam track 330 has a portion 330a that progressively recedes from the shaft 326. Accordingly, when the cam is rotated clockwise (FIG. 2) the roller 331 and the unit D will be moved toward the front of the machine. It will be understood that the rotation of the cam 325 is coordinated with the movement of the cups of the transfer mechanism B so that, when a peach half in a transfer cup is positioned on the pit stops of the pitter head, the head will be moved forwardly with the cup and at substantially the speed of the cup. The cam track 330 has a portion 330b adapted to hold the head for a short period at its outermost position, and a portion 330c adapted to return the head to its initial, peach receiving position.

During the forward movement of the unit toward the front of the machine, the mounting plate 136 of the unit D is confined between two rollers 340 and 341 (FIGS. 2 and 15) which are rotatably mounted in a boss 344 formed on the lower surface of a generally U-shaped bracket 345 (FIGS. 12 and 15) that is secured between the side walls 73 and 74 near their uppermost edges.

As the pitting head D moves forwardly, the lever 231 (FIG. 12), which actuates the gear mechanism in the head, comes into contact with a cam 350 (FIGS. 12 and 13) which is bolted to the upper surface of the bracket 345. The lever 231 and the cam 350 are so arranged that the rounded outer edge of the lever first engages a camming surface 350a, as seen in FIG. 13, causing the lever 231 to be pivoted counterclockwise. Pivotal movement of the lever 231 actuates the gear mechanism in the head and results in the pitting hook being swung into engagement with the pit to tear it loose from the peach flesh. Just after the pit is freed from the peach, an edge portion 360 on the lever 231 engages a surface 350b on the cam 350 causing the pivoting of the lever to be accelerated whereby a flipping motion is imparted to the pit. It is to be noted that maximum torque is obtained during the actual pitting by the engagement of the outermost end of the lever 231 with the cam, while increased speed is obtained after the pit is loosened by the use of a short length of the lever.

The cam 261 (FIGS. 9 and 12), which controls the position of the push rod 256 that actuates the pit stops, is secured by capscrews 355 to a block 356 that is adjustable relative to a fixed support member 357. The member 357 is bolted to a bracket 361 (FIGS. 12 and 16) that is secured to the transverse U-shaped bracket 345. The member 357 is adjustably secured on the bracket 361 by two capscrews 361a (FIG. 16) which extend through slots 361b in the bracket and are threaded into the member 357. The capscrews 355 (FIG. 9), which extend through holes in the block 356 and are in threaded engagement with the cam 261, also extend through a block 354 that is slidably disposed in a slot 362 in the rigid support member 357. When the capscrews are tightened down, the cam 261 is locked to the fixed member 357 and when they are loosened the position of the cam can be changed by shifting the block 354 and the capscrews toward either end 362a or 362b of slot 362. The cam 261 may be shifted longitudinally of the support member 357 by means of an adjusting screw 364 (FIG. 12) that is threaded in the block 356 and is held in an opening 365 in the support member 357 by a lock nut 367. With this arrangement, the release of the push rod 256 by the camming surface 260 may be precisely controlled so that the pit stops are retracted in timed relation with the actuation of the pit finders and the pitting hook. It will be appreciated that, if the stops are fully retracted before the pit finders start to close, the pit finders will have to cut away a considerable amount of flesh. On the other hand, the pit finders cannot be closed fully before the stops are retracted because they would prevent the inward movement of the peach. With the present arrangement, the timing of the movements of the pit finders and the pit stops may be coordinated so that the pit finders move into position behind the pit without cutting away an excessive amount of meat.

A spring 370 (FIG. 12) is connected between the outermost end of the lever 231 and a bolt 371 secured to a fixed arm 372 projecting outwardly from the cam 350. The spring 370 normally biases the lever to a predetermined outermost position and accordingly, the pitting hook 200 is normally held in a position disposed inwardly of the pit finders, substantially as shown in FIG. 5.

Each of the levers 180 (FIG. 6), which applies a force to the capscrew 170 at the upper end of the rod 158 and to the capscrew 156 on the lever 154 to move the sliding plates 140 and 141 to open position, is welded to a sleeve 380 (FIGS. 12 and 14) that is rotatably mounted on bushings 381 disposed around a stud 382. The stud 382 has a cap 383 welded on one end and is threaded at the other end to receive a nut 384 which locks the stud on the adjacent wall of the machine. An actuating arm 390 is welded to and projects radially outwardly from the sleeve 380, and a roller 391 that is rotatably mounted on the end of the actuating arm 390 rides on a camming surface 393a of a cam 393 keyed to the power driven shaft 326 (FIG. 14). A counterbalance arm 395, which is also welded to the sleeve 380 carries a weight 396 near its outer end. A spring 397, connected between the arm 395 and a fixed structural member of the machine, biases the sleeve 380 in a clockwise direction. The camming surface 393a is so designed that the lever 180 is pivoted in a counterclockwise direction to engage the capscrews 170 and 156 and hold the pit finders 185 and 186 in open position when the pitting head D is in its peach receiving position. After a peach half is positioned on the head and the head moves forwardly to start the pitting operation, the camming surface 393a releases the roller 391 at a predetermined rate, permitting the counterbalance spring 397 to pivot the lever 180 clockwise. In this manner, the pit finders are released so that they can close under the urging of their associated springs. Therefore, the cam 393 regulates the time of the beginning of the closing of the pit finders and the rate at which they are closed. The lever 180 is pivoted counterclockwise to a predetermined position by the cam 393 while the head is in its forward position. Accordingly, when the head is returned to its peach-receiving position, the capscrews 170 and 156 will be automatically engaged and depressed by the lever 180 and the pit finders will be moved to open position.

It will be noted that, if one of the springs 397 (FIG. 14) should break after the pit finder capscrews 156 and 170 have moved forwardly out of contact with the lever 180 as seen in FIG. 15, the associated lever 180 would drop downwardly. Then, when the head is returned toward the right, the capscrews would engage the end of the lever 180 and be damaged thereby. To prevent this occurrence, a safety arm 398 (FIG. 7) is secured to and projects outwardly from the top surface of each lever 180. This arm 398 normally is disposed in spaced relation above the top of capscrew 170 as seen in FIG. 12. However, if the spring 397 should break, the arm 398 will drop onto the top surface of the capscrew 170, and will be prevented from dropping to a lower position in which the lever 180 would cause damage to the capscrews 156 and 170. If desired, the safety arm 398 could be mounted on the side face of the lever 180 instead of on the top surface. With this latter arrangement, the safety arm would drop onto the upstanding boss 155 mounted on the head.

As previously mentioned, during the forward movement of the pitting head D, the rounded outer edge (FIG. 13) of the lever 231 engages a surface 350a of the cam 350 causing the pitting hook to engage and tear the pit from the meaty portion of the peach half. In order to more efficiently accomplish this pitting action, the head D is given an extra push just before the edge 360 hits the cam surface 350b. This extra push is effected through an assist cam 400 (FIG. 15) that has a central opening 400a and is adjustably secured by bolts 401 to the hub 402 (FIG. 12) of a gear 403 which is keyed to the shaft 326, and is in mesh with the large gear 88. The bolts 401 pass through holes (not shown) in a clamping plate 404, through the opening 400a in the cam, and are threaded in the hub 402. By loosening the clamping plate, the position of the cam may be varied. A pair of arms 405 and 406 are welded in longitudinally spaced relation on a sleeve 407 that is rotatably journalled on a rod 410 projecting outwardly from a plate 411 bolted to the side wall 74. The rod 410 is internally threaded at its free end 410a to receive a capscrew 415 which engages a washer 416 to lock the sleeve 407 against axial movement on the rod. A tension spring 420 (FIG. 15) is stretched between the end portion of the arm 406 and an eyelet 421 formed on a bolt 422 that is adjustably threaded in a tab 425 projecting from a fixed mounting plate 426. The cam 400 has a camming surface 430 arranged to engage a roller 431 on the arm 405 to pivot the arm 405 clockwise against the resistance of the spring 420 as the cam is rotated clockwise. When the roller 431 rides off the crest 430a of the caming surface, the spring 420 causes the arm 405 to swing counterclockwise, causing the roller 431 to impact against a surface 430b and impart a clockwise turning moment to the shaft 326. The turning moment is transmitted through the shaft 326 to the cam 325 (FIG. 2) which controls the forward movement of the pitting head. Since the cam 400 may be adjusted relative to the gear 403 that is keyed to the shaft 326, the impact of the roller 431 can be accurately coordinated with the forward movement of the pitting head.

The cam 400 is also provided with a camming surface 430c which is engaged by the roller 431 just as the capscrews 170 and 156 are forced under the lever 180 during the return movement of the head to peach-receiving position whereby the pit finders are moved to open position.

As previously mentioned, at the beginning of the pitting operation, the pit stops 242 are withdrawn and the peach half, that was supported on the pit stops, is urged inwardly toward the pit finders by the spring 75 (FIG. 3) which is conneced to each cup-support arm 63. The action of the spring 75 is supplemented by a lever 450 (FIG. 17) that is pivotally mounted on the inner side wall 74 of the machine by a pin 451. The lever 450 is resiliently loaded by means of a stud 453 that extends through an opening 454 in the wall 74 and engages the outer end 450a of the lever which, in turn, engages the roller 76 that is mounted on each cup support arm 63. The stud 453 is adjustably secured in one end of a flat leaf spring 455 that has its other end bolted to the outer surface of the wall 74. The pressure that the spring exerts on the lever 450 through the stud 453 may be increased by a rod 460 that has an end portion 461 disposed between the side wall 74 and the spring. At its upper end the rod 460 is pivotally connected to a lever 462 that is bolted to the wall 74. When the end portion 461 of the rod 460 is moved upwardly away from the point of attachment of the leaf spring to the wall 74, the pressure exerted by the spring is decreased. With this arrangement, the pressure exerted on the peach half to force it inwardly as the pit finders close, can be regulated in accordance with the ripeness of the fruit. The greener the peach, the greater must be the pressure that is applied.

Th operation of the unit 125 of the pitting head from the time the peach half is delivered to the unit to the time the pitted peach is discharged will be described with particular reference to FIG. 2 and FIGS. 18 to 25, inclusive. It will be understood that the unit 126 of the head is being operated at the same time in exactly the same manner.

In FIGS. 18 and 22, a peach half H has been positioned on the pitting head by the cup 60 and is supported jointly by the two pit stops 242 and the plate 240. As soon as the peach half arrives at this position, the cam 325 (FIG. 2) accelerates the head forwardly so that it operates in conjunction with the cup 60. As the head starts forwardly, the pit finder control lever 180 is quickly cammed upwardly permitting the pit finders to close, the pit stop push rod 256 (FIG. 9) drops off the cam surface 260 permitting the pit stops to be retracted, and the lever 231 on the top of the unit engages the cam 350 to actuate the gear mechanism and the pitting hook.

In FIGS. 19 and 23, the pit stops have been retracted and the pit finders have been moved to closed position. The pitting hook 200 then contacts the pit (FIG. 20) and tears it loose from the meaty portion of the peach half, leaving in the peach cavity a considerable portion of the meat that was in contact with the pit. The pit is shifted longitudinally (FIG. 21) of the stem-blossom axis of the peach into contact with the inner slanted surfaces of the pit finders. The pit finders cam the pit inwardly of the head, causing the pit to pivot on an axis, indicated by the reference X in FIG. 21, that is in or near the suture plane and is normal to the stem-blossom axis.

When the pit has been flipped inwardly by the pitting hook, the cup 60 moves outwardly away from the head D to permit the peach half to drop into the discharge chute that is positioned below the head.

From the foregoing description it will be evident that the present invention provides a novel, efficient method of removing a pit from a peach. The procedure whereby the pit is removed from the peach with a tearing and shearing action provides a simple and effective way of leaving in the cavity a considerable portion of the meat that was contiguous to the pit.

It is to be noted that when the pit finders 185 and 186 move in behind the pit, they make a cut completely encircling the pit and enclose the edges of the pit which were weakened when the saw cut the peach in half. Since the pit finders completely enclose the outer edge of the pit, it is not possible for fragments of the edges of the pit to be left in the cavity after the pit has been removed.

The use of the pit finders to cam the pit inwardly of the unit as the hook engages the pit makes it possible to remove the pit from the cavity without breaking out the meat at the stem end of the peach. Further, as seen in FIG. 20, the hook 200 first contacts the edge of the pit. If the peach had a weak or split pit, this edge will break away. However, as the hook moves inwardly along its arcuate path, it soon contacts the solid part of the pit and exerts pressure thereon to tear the pit loose and eject it. Since, as previously mentioned, the pit finders completely encircle the edges of the pit, none of the splinters or fragments will remain in the cavity. Accordingly, the combined use of a hook and pit finders provides an arrangement whereby a large portion of peaches having weak or split pits can be successfully pitted.

Referring to FIGS. 2, 26 and 27, it will be noted that the cam 325 causes the pitting head to move forwardly in timed relation with the feed cup 60, which positions the peach half on the pit stops 242. In one form of the present machine the cam 325 is designed so that the forward movement of the head is advanced just after retraction of the pit stops 242 is begun. This has the effect of causing the edges of the pit finders 185 and 186 to approach closely to the stem end of the pit. With this arrangement, more space is provided between the edges of the pit finders and the spine end of the pit, and this extra wide space permits the hook 200 to more easily enter the peach and contact the spine end of the pit. It is also evident that this arrangement compensates for pits that are off center longitudinally.

In FIGS. 28, 29 and 30, a modified form of the peach pitting head of the present invention is illustrated. This head, which is indicated by reference letter D', is generally similar to the head D of FIGS. 4, 5 and 6 with the exception that the gears for operating the pitting hook are mounted on the top of the frame of the head rather than inside the head. Since many of the members of the heads D and D' are substantially identical in design and operation, the parts of head D' that correspond to parts of head D, will be given identical reference numerals with the suffix "A" and these parts will not be described in detail.

The head D' (FIG. 28) comprises two units 500 and 501. The unit 500 has a frame 504 (FIG. 29) having an uper wall 505 on which a gear segment 508 and three gears 509, 510 and 511 are mounted. The gear segment 508 is secured by a capscrew 513 to the hub 514 of a lever 515 that is pivotally mounted on the shaft projection 232A. The gear 509 is in mesh with gear segment 508 and is journalled on the shank of a hold-down bolt 517. The gear 510, which meshes with gear 509, is freely rotatable on the shank of a hold-down bolt 519. The gear 511 is in mesh with gear 510 and is keyed to a shaft 522 that is rotatably journalled in the frame 504. A pitting hook 525 (FIGS. 29 and 30) has a square opening 526 in its hub 527 that is arranged to receive a portion 522a of shaft 522 that is square in cross section. In FIGS. 31 and 32, the longitudinal axis of the square shaft portion 522a is indicated by cross Y and the axis of the shaft 522 is indicated by cross W. Due to the eccentricity of the square shaft portion 522a, the path of travel of the end of the hook can be adjusted relative to the pit finder edges 185A and 186A by slipping the hook off the lower end of the shaft portion 522a, rotating the shaft ninety, one hundred eighty, or two hundred seventy degrees, and sliding the hook back on the shaft. In FIGS. 31 and 32, the four possible paths of movement of the end of the hook are shown in dot-dash lines 529a, 529b, 529c and 529d.

A plate 530 (FIG. 29) is disposed between the gears 509, 510 and 511 and the upper wall 505 of the frame 504 and is secured to the frame by the hold-down bolts 517 and 519. A boss 535 is integrally formed on the plate 530 and projects upwardly therefrom. One end of a shaft 537 is keyed by a setscrew 538 in an opening in the boss 535. The other end of the shaft 537 extends over the unit 501 and is keyed in an aperture 540 (FIG. 28) in a boss 541 formed on a plate 542 that is secured by a hold-down bolt 543 to the top of the frame of unit 501. A gear 545, which is in mesh with the gear 510, is supported by the plate 542 and is freely rotatable on the shank of the bolt 543. A second gear 546 meshes with gear 545 and is keyed to a shaft 547 on which the pitting hook (not shown) of unit 501 is keyed. With this arrangement, the pitting hooks of both units are actuated simultaneously when the lever 515 is pivoted.

The pitting head D' operates to position and pit a peach half in substantially the same manner as described in the operation of the head D.

It will be understood that modifications and variations of the embodiment of the invention disclosed herein may be resorted to without departing from the scope of the concepts of the invention. Therefore, the scope of the invention should be limited only by the scope and proper interpretation of the claims appended hereto.

What is claimed to be new and for which Letters Patent is desired is:

1. In an apparatus for pitting fruit, a frame, a pair of cutting blades mounted on said frame for movement toward and away from each other, said blades having oppositely curved cutting edges disposed in opposed relation with the space between said edges defining a pitting opening, means for positioning a peach half against said blades with the pit side of the peach half in engagement with said blades and with the pit half disposed opposite the pitting opening, a pit ejector mounted on said frame for movement along an arcuate path independently of said blades through said pitting opening defined by said blades and into the pit cavity of the peach half to strike an edge of a pit half therein to apply an arcuate force to the pit half in a direction to eject the pit half from the cavity, and means for moving said pit ejector through said opening.

2. In an apparatus for pitting fruit, a frame, a pair of pit finding members mounted on said frame for movement toward and away from each other, said members having oppositely curved cutting edges disposed in confronting relation with the space between said edges defining a pitting opening, positioning means arranged to hold a peach half adjacent said finding members with the pit half disposed in said pitting opening, actuating means urging said pit finding members toward each other to contact the pit disposed in said opening, a pit striker mounted on said frame for movement through the opening defined by said pit finding members at a point adjacent one of said pit finding members to strike the pit engaged by said pit finding members, and means for consecutively activating said actuating means to close said pit finding members and then moving said pit striker through said opening at a point adjacent one of said pit finding members.

3. In an apparatus for pitting fruit, a frame, a pair of pit gripping blades mounted on said frame for movement toward and away from each other, said blades having oppositely curved cutting edges disposed in confronting relation with the space between said edges defining a pitting opening, positioning means arranged to hold a peach half adjacent said blades with the pit half disposed in said pitting opening, actuating means urging said pit half gripping blades toward each other to grip a pit disposed in said opening, a pit striker mounted on said frame for movement through said opening to strike a pit half held therein by said gripping blades, a gear mechanism operatively connected to said pit striker for moving said striker through said opening, and means associated with said pit gripper actuating means and said gear mechanism for consecutively activating said actuating means to close said blades and then operating said gear mechanism to move said pit striker through said opening.

4. In an apparatus for pitting fruit, a pair of cutting blades mounted for movement toward and away from each other in a common plane with the space between said edges defining a pitting opening, means holding said blades in spaced apart position, means for positioning a peach half adjacent said blades with the pit side of the peach half facing said cutting blades and the pit half disposed opposite the pitting opening, means for moving the peach half toward said blades and moving the blades toward each other, means coordinating the movement of said blades and said peach so that said cutting blades cut into the meat of the peach around the pit as they move toward each other in said common plane to contact the pit as it is moved into said pitting opening, a pit striker mounted for movement through said pitting opening, and actuating means coordinated with the movement of said blades and operatively connected with said pit striker for moving said striker through said opening when the pit is held therein by said blades whereby to contact the pit and tear it loose from said peach half.

5. In an apparatus for pitting fruit, a pair of cutters mounted for movement toward and away from each other, each of said cutters having a flat side face and a cutting edge spaced from the side face, said cutting edges being disposed in a common plane with the space between said edges defining a pitting opening, means holding said cutters in spaced apart position, means for positioning a peach half adjacent said cutters with the pit side of the peach half facing said cutting edges and the pit half disposed opposite the pitting opening, means for moving said cutters toward each other and moving the peach half toward said cutters, means coordinating the movement of said cutters and said peach so that said cutting edges cut into the meat of the peach around the pit as they move in said common plane to grip the pit as it is moved into said pitting opening, a pit striker mounted for movement through said pitting opening, and means for moving said pit striker through said opening when the pit is gripped by said cutting edges.

6. In an apparatus for pitting fruit, a pair of spaced blades mounted for reciprocating movement toward and away from each other and having confronting curved edges disposed in spaced relation to define a pitting aperture, means for positioning a peach half closely adjacent said blades with the pit side of the peach half facing said blades and the pit half disposed opposite said pitting aperture, a pit striker mounted for movement through said pitting aperture, first actuating means operable on said peach positioning means and arranged to urge the peach half toward said blades to move the pit half into said pitting aperture, second actuating means connected to said blades and arranged to urge said blades toward each other to cut into the peach half in the area surrounding the pit half, third actuating means operatively connected to said pit striker for moving the said striker through said pitting aperture, and means for coordinating the operation of all of said actuating means to cause the peach half to be moved toward said pitting aperture as said blades move into position encircling the pit, and to cause said pit striker to move through said aperture immediately after said blades are positioned around said pit.

7. In an apparatus for pitting fruit, a pair of cutting blades mounted for movement toward and away from each other in a common plane and having opposed edges with the space between said edges defining a pitting cavity, blade actuating means for moving said blades toward and away from each other, peach support means mounted for movement through said pitting cavity from a projected position on one side of the plane of said blades, to a retracted position on the opposite side of said plane, means for holding said support means in said projected position, means for positioning a peach half adjacent said cutters with the pit side of the peach half facing said cutting blades and resting on said support means and with the pit half disposed opposite the pitting cavity, means operable on said positioning means for exerting a pressure on the peach half tending to move the pit toward said cavity, means for simultaneously moving said blades toward each other and moving said peach support means from said projected position to said retracted position whereby said blades move into gripping engagement with the pit as the pit moves into said cavity 8. In an apparatus for pitting fruit, a housing, a pair of cutting blades slidably mounted on said housing and arranged to be moved between a position adjacent each other to a spaced apart position, said cutting blades having oppositely disposed curved edges adapted to grip the surface of a pit when said blades are moved to said adjacent position, spring means urging said blades toward said adjacent position, pressure applying means connected to said blades for holding said blades in said spaced apart position against the urging of said spring means, support means having a planar surface disposed in parallel spaced relation to the plane of movement of said cutting blades, said support surface being adapted for supporting a peach half adjacent said cutting blades, means for positioning a peach half on said support means with the pit half in alignment with and facing the space between said blades, means operable on said positioning means for causing said positioning means to press the peach half tightly against said peach support surface and toward the plane of said blades, and means for removing said support means from said peach and releasing said pressure applying means from said blades, whereby said positioning means moves said peach half toward the plane of said blades as said spring means moves said blades toward each other to grip the pit half as it moves into the cavity.

9. In an apparatus for pitting fruit, a housing, a pair of pit grippers mounted on said housing and arranged to be moved between a position adjacent each other to a spaced apart position, said grippers having oppositely disposed curved edges adapted to grip the surface of a pit disposed in the pitting opening defined between said edges, means for positioning a peach half adjacent said grippers with the pit side of the half facing said grippers and the pit half disposed opposite the pitting opening between said curved edges, and means disposed in the path of movement of said positioning means to be contacted by said positioning means when the peach half is adjacent said grippers for applying pressure to said peach half through said positioning means and urging said peach half toward said pit grippers.

10. In an apparatus for pitting fruit, a pair of cutting blades mounted for movement toward and away from each other in a common plane with the space between said edges defining a pitting cavity, means holding said blades in spaced apart position, means for positioning a peach half adjacent said cutters with the pit side of the peach half in a plane parallel to the plane of said blades and facing said cutting blades and with the pit half disposed opposite the pitting cavity, actuating means for moving the peach half toward said blades and moving the blades toward each other, and control means connected to said actuating means coordinating the movement of said blades and the peach half so that said cutting blades cut into the meat of the peach around the pit half as they move toward each other in said common plane to contact the pit half as it is moved into said pitting cavity.

11. In an apparatus for pitting fruit, a housing, a pair of cutters slidably mounted on said housing and arranged to be moved between a position adjacent each other to a spaced apart position, said cutters having flat side faces disposed in a first plane and cutting edges disposed in a second plane spaced from said side faces, means for holding said cutters in said spaced apart position, means for positioning a peach half with the pit side in a plane parallel to the plane of said cutting edges and with the pit half in alignment with the opening between said edges, means for moving said cutters toward each other and moving the peach half toward the plane of said cutting edges, and means for coordinating the closing movement of said cutters and the movement of the peach toward the plane of said edges in such a manner that the flat face of the peach half is moved into engagement with the side faces of the cutters as the edges of the blades cut into the flesh of the peach and grip the pit half.

12. In an apparatus for pitting fruit, a housing, a pair of pit grippers mounted on said housing and arranged to be moved between a position adjacent each other to a spaced apart position, said grippers having oppositely disposed curved edges adapted to grip the surface of a pit disposed in the pitting opening defined between said edges, means for positioning a peach half adjacent said grippers with the pit side of the half facing said grippers and the pit half disposed opposite the pitting opening between said curved edges, means operably connected to said positioning means for applying pressure to said peach half through said positioning means and urging said peach half toward said pit grippers, and resilient means operably connected to said positioning means for applying supplemental pressure to said peach half through said positioning means and urging said peach half toward said grippers only when the peach half is positioned adjacent said grippers.

13. In an apparatus for pitting fruit, a stationary support, a pitting head mounted for movement on said support, means for moving said head through a predetermined distance relative to said support, means on said head defining a pitting opening, a pit striker mounted on said head for movement through said pitting opening, spaced abutment members on said stationary support, an actuating lever mounted on said head, and means operatively connected between said lever and said pit striker to move said pit striker through said pitting opening incident to pivoting of said lever, said lever being bodily movable with said head and having an outer end portion adapted to strike one of said abutments to pivot said lever and having a portion closer to the pivot axis arranged to engage the other abutment to accelerate the swing of said lever and the pit striker associated therewith.

14. In an apparatus for pitting fruit, a frame mounted for movement along a fixed path and having a wall with an aperture therein, a lever pivotally mounted on said frame on one side of said wall, a fruit support member operatively connected to said lever and having a support surface movable through said aperture to a projected fruit-supporting position in spaced relation to the other side of said wall, a push rod slidable in said frame and having one end in engagement with said lever, an adjustable cam disposed adjacent said frame and having a camming surface disposed in the path of movement of the other end of said push rod in position to be engaged thereby during movement of said frame along said fixed path, engagement of said cam by said push rod being effective to slide said push rod in said frame to pivot said lever and move said fruit support member to said fruit-supporting position, and means for moving said frame.

15. In an apparatus for pitting fruit, a housing having a wall with an opening therein said opening having a pair of opposed marginal edges, means for positioning the pit side of a peach half against said wall with the pit half extending into said opening, a bracket disposed in said housing, a shaft journaled in said bracket substantially equidistant from said marginal edges, a pit striker keyed to said shaft inside said housing and having an end portion movable along an arcuate path past one of said marginal edges into said opening and out of said opening past the other marginal edge upon rotation of said shaft, gear means operatively connected to said shaft, means for actuating said gear means, and means for adjustably mounting said bracket on said housing for varying the path of movement of said pit striker relative to the margins of said opening.

16. In an apparatus for pitting fruit, a stationary support, a pitting head frame mounted for movement on said support, means for moving said frame through a predetermined distance relative to said support, means disposed on said frame in spaced confronting relation to provide a pitting opening, means for positioning a peach half against said frame with the pit half and its cavity opposite said pitting opening, a pit striker mounted on said frame for movement through said pitting opening, a cam on said stationary support, an actuating lever mounted on said frame in a position to be contacted and pivoted by said cam member as said frame is moved through said predetermined distance, and means operatively connected between said lever and said pit striker to move said pit striker through said pitting opening to engage the pit half and loosen it from the wall of its cavity incident to pivoting of said lever through contact with said cam member, said cam member having a camming surface constructed and arranged to accelerate the movement of said striker after said striker has contacted and loosened the pit half.

17. In an apparatus for pitting fruit, a housing having a wall with an opening therein, a shaft mounted in said housing adjacent said opening, said shaft having a cylindrical portion journaled for rotation in said housing and a portion of square transverse cross-section formed as an extension of said cylindrical portion and disposed on a longitudinal axis spaced from the axis of rotation of said cylindrical portion, a hook having a hub with an aperture of square cross-section adapted to receive the square portion of said shaft, said shaft being so positioned relative to said opening that an end portion of said hook moves through said opening closely adjacent the marginal edges of said opening during rotation of said shaft, and said hook being removably disposed on said square shaft portion whereby the path of movement of said hook end portion relative to the margins of said opening may be varied by changing the angular relation of said hook to said square shaft portion.

18. In a device for removing a pit half from a peach half, the combination of a pair of blades having curved cutting edges disposed in a common plane and conforming substantially to the curvature of the pit half, means for supporting a peach with the cut side exposed and facing the opening between said cutting edges, means mounting said blades for movement toward each other to advance said cutting edges in a plane parallel to the plane of the cut side of the peach half, and means for simultaneously moving said blades toward each other in said plane and moving the peach half in a direction normal to said plane toward said blades to cause said cutting edges to penetrate into the peach half and encircle the marginal edge of the pit half.

19. In a device for removing a pit half from a peach half, a housing having a pitting opening, means for supporting a peach half with the cut face exposed and the pit half positioned adjacent the pitting opening of said housing, a pit finder mounted on said housing for movement into engagement with the surface of the pit, a pit ejector mounted on said housing in predetermined position relative to said pit finder for movement along a path adjacent the path of said pit finder, and means for first moving said pit finder into contact with the pit half to locate it and then moving said ejector along said adjacent path to engage the pit half and eject it from its cavity.

20. Apparatus for removing a pit half from a peach half comprising means for holding a peach half in fixed position with the cut face and the pit half exposed, a pair of pit finders having curved edges, means for moving said curved edges into position encircling a marginal portion of the pit half, said curved edges being formed to fit snugly along the sides of the pit half but to provide openings between the edges and the stem and spine ends of the pit half, and a pit ejector mounted in fixed relation to said pit finders and arranged for movement into one of said openings to engage the end of the pit half to eject it from its cavity.

21. In an apparatus for pitting fruit, a housing having a pitting opening, means mounting said housing for movement along a fixed path, a fruit positioning member mounted for movement along a path parallel to and closely adjacent the path of said housing, means for coordinating the movements of said housing and said fruit positioning member so that a peach half carried on said positioning member will be disposed opposite said opening and moving at substantially the same speed, a pair of pit finders mounted on said housing for movement outwardly through the pitting opening to penetrate the peach half at points encircling the pit half but spaced from the spine end of the pit, and a pit ejector mounted on said housing in predetermined relation to said pit finders for movement through the pitting opening and into the space between the pit finder and the spine end of the pit half to contact the pit half and eject it from the machine.

References Cited in the file of this patent

UNITED STATES PATENTS

| | | |
|---|---|---|
| 475,048 | Stanford | May 17, 1892 |
| 706,936 | Heffley | Aug. 12, 1902 |
| 794,598 | Dunkley | July 11, 1905 |
| 1,357,004 | Robbins | Oct. 26, 1920 |
| 2,108,535 | Jepson | Feb. 15, 1938 |

(Other references on following page)

UNITED STATES PATENTS

| | | |
|---|---|---|
| 2,329,212 | Nawman | Sept. 14, 1943 |
| 2,376,526 | Thompson | May 22, 1945 |
| 2,581,785 | De Back et al. | Jan. 8, 1952 |
| 2,623,564 | Ewald et al. | Dec. 30, 1952 |
| 2,629,416 | Luther | Feb. 24, 1953 |
| 2,652,085 | Ansley | Sept. 15, 1953 |
| 2,771,926 | Willsey | Nov. 27, 1956 |
| 2,818,098 | Perrelli | Dec. 31, 1957 |
| 2,924,259 | Magnuson | Feb. 9, 1960 |
| 2,943,659 | Anderson | July 5, 1960 |
| 2,975,812 | Perrelli | Mar. 21, 1961 |